United States Patent
Ekstrand et al.

(10) Patent No.: US 10,694,020 B2
(45) Date of Patent: Jun. 23, 2020

(54) INFORMATION DISPLAYING METHOD AND TERMINAL

(71) Applicant: Huawei Technologies Co., Ltd., Shenzhen (CN)

(72) Inventors: Simon Ekstrand, Eslov (SE); Hang Li, Shenzhen (CN); Zhiming Fan, Shenzhen (CN); Xueyan Huang, Shenzhen (CN); Zewen Li, Shenzhen (CN); Sha Qian, Shenzhen (CN); Shouyu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/351,054

(22) Filed: Mar. 12, 2019

(65) Prior Publication Data
US 2019/0215397 A1      Jul. 11, 2019

Related U.S. Application Data

(63) Continuation of application No. PCT/CN2017/089395, filed on Jun. 21, 2017.

(30) Foreign Application Priority Data

Sep. 13, 2016   (CN) .......................... 2016 1 0822801

(51) Int. Cl.
*H04M 1/725*   (2006.01)
*G06F 3/0481*   (2013.01)
(52) U.S. Cl.
CPC ...... *H04M 1/72558* (2013.01); *G06F 3/0481* (2013.01); *H04M 1/72583* (2013.01)

(58) Field of Classification Search
CPC .......... H04M 1/72558; H04M 1/72583; G06F 3/0481
See application file for complete search history.

(56) References Cited

U.S. PATENT DOCUMENTS 7,225,405 B1 *   5/2007   Barrus ................. G06F 3/0481
                                               715/716
9,104,299 B2     8/2015   Li
(Continued)

FOREIGN PATENT DOCUMENTS

| CN | 1156377 A | 8/1997 |
|---|---|---|
| CN | 1321964 A | 11/2001 |

(Continued)

*Primary Examiner* — Dinh Nguyen
(74) *Attorney, Agent, or Firm* — Leydig, Voit & Mayer, Ltd.

(57) ABSTRACT

An information displaying method and a terminal are provided. The method includes: obtaining audio data to be played in a chronological order; determining, based on attribute information at any moment of a sound represented by the audio data, a shape of a graph corresponding to the any moment, where the graph corresponding to the any moment including a closed curve with a bump, and a maximum distance in distances from points on the bump to a center of the graph is positively correlated to a value indicated by the attribute information at the any moment; and displaying the graph corresponding to the any moment. The bump in the graph changes with the value indicated by the attribute information of the sound, and such graph is presented to a user, to enhance perception of the user on the attribute information of the audio data and improve user experience.

16 Claims, 13 Drawing Sheets

(a)

(b)

(56) References Cited

U.S. PATENT DOCUMENTS

| | | | | |
|---|---|---|---|---|
| 9,286,383 | B1* | 3/2016 | Robinson | A63F 13/54 |
| 2002/0133513 | A1* | 9/2002 | Townsend | G11B 27/034 |
| | | | | 715/203 |
| 2003/0187893 | A1 | 10/2003 | Cheng | |
| 2006/0274144 | A1* | 12/2006 | Landschaft | H04M 19/04 |
| | | | | 348/14.01 |
| 2011/0009103 | A1 | 1/2011 | Do | |
| 2011/0054902 | A1* | 3/2011 | Li | G10L 13/033 |
| | | | | 704/258 |
| 2013/0099776 | A1 | 4/2013 | Wu et al. | |
| 2015/0067511 | A1* | 3/2015 | Lee | G06F 3/165 |
| | | | | 715/716 |
| 2016/0364888 | A1* | 12/2016 | Jeon | G09G 3/2003 |

FOREIGN PATENT DOCUMENTS

| | | |
|---|---|---|
| CN | 2550982 Y | 5/2003 |
| CN | 102540079 A | 7/2012 |
| CN | 102694408 A | 9/2012 |
| CN | 102957178 A | 3/2013 |
| CN | 104237807 A | 12/2014 |
| CN | 104574453 A | 4/2015 |
| CN | 105117102 A | 12/2015 |
| CN | 106468997 A | 3/2017 |
| WO | 2014038154 A1 | 3/2014 |

* cited by examiner (a) (b) (c)

(a) (b) (c)

(a) Metal material  (b) Wood texture material (a) Stage A  (b) Stage B  (c) Stage C (a) First stage  (b) Second stage (a) Solo recording mode   (b) Group recording mode   (c) Face-to-face recording mode Voice assistant (a) Middle-aged male  (b) Girl (a) Organic graph 1  (b) Organic graph 2

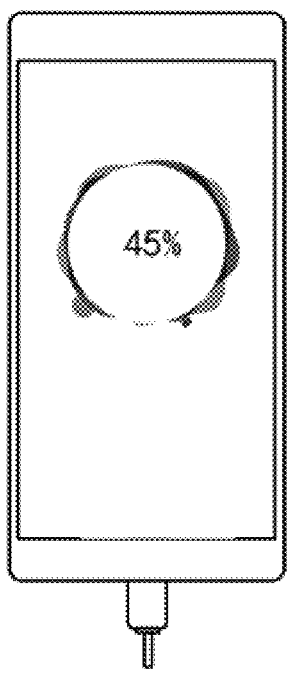

```
┌─────────────────────────────────────────────────────────────┐  ← 410
│ Obtain charging attribute information of a terminal at any   │
│                 moment in a charging process                 │
└─────────────────────────────────────────────────────────────┘
```

```
┌─────────────────────────────────────────────────────────────┐  ← 420
│ Determine, based on the charging attribute information at the│
│ any moment, a shape of a graph corresponding to the any      │
│ moment, where the graph corresponding to the any moment      │
│ includes a closed curve with a bump, and a maximum distance  │
│ in distances from points on the bump to a center of the graph│
│ corresponding to the any moment is positively correlated to a│
│ value indicated by the charging attribute information at the │
│ any moment                                                   │
└─────────────────────────────────────────────────────────────┘
```

```
┌─────────────────────────────────────────────────────────────┐  ← 430
│              Display the graph at the any moment             │
└─────────────────────────────────────────────────────────────┘
```

```
┌─────────────────────────────────────────────────────────────┐  ← 440
│ Display an animation in which a particle graph at the any    │
│        moment moves to the graph at the any moment           │
└─────────────────────────────────────────────────────────────┘
```

FIG. 27

INFORMATION DISPLAYING METHOD AND TERMINAL

CROSS-REFERENCE TO RELATED APPLICATIONS

This application is a continuation of International Application No. PCT/CN2017/089395, filed on Jun. 21, 2017, which claims priority to Chinese Patent Application No. 201610822801.5, filed on Sep. 13, 2016. The disclosures of the aforementioned applications are hereby incorporated by reference in their entireties.

TECHNICAL FIELD

The present disclosure relates to the field of mobile communications, and in particular, to an information displaying method and a terminal.

BACKGROUND

Currently, there are a large quantity of terminals with intelligent touchscreens on the market. When a user interacts with a terminal, for example, plays music or a video by using the terminal or performs intelligent conversation or an instant quiz by using a voice interaction intelligent assistant (for example, Siri of Apple) on the terminal to implement problem query and application operations, the terminal completes only sound transfer, but does not bring visually three-dimensional experience to the user.

In the prior art, in a sound transfer process, some visual elements are added. For example, when music is played by using a music player, a disc rotates; and when the music stops, the disc stops rotating, as shown in FIG. 1. Although improvements are made in the prior art, experience brought to a user is relatively undiversified visually or in a dynamic form and is lacking in flexibility, and a degree of attention paid by the user to a dynamic effect on an interface during music play of the music player cannot be improved, causing poor user experience.

SUMMARY

The present disclosure provides an information displaying method and a terminal, to add, by obtaining audio data played in a chronological order and presenting attribute information of the audio data at each moment by using a dynamic graph, a visually dynamic effect for a user, enhance perception of the user on the attribute information of the audio data, implement a three-dimensional feeling visually or in a dynamic form when the user interacts with the terminal, and improve user experience.

According to a first aspect, an embodiment of the present disclosure provides an information displaying method. The method includes:

obtaining audio data to be played in a chronological order; determining, based on attribute information at any moment of a sound represented by the audio data, a shape of a graph corresponding to the any moment, where the any moment falls within a range from a start play moment of the sound to an end play moment of the sound, the graph corresponding to the any moment includes a closed curve with a bump, and a maximum distance in distances from points on the bump to a center of the graph corresponding to the any moment is positively correlated to a value indicated by the attribute information at the any moment; and displaying the graph corresponding to the any moment.

The attribute information at the any moment of the sound represented by the audio data played in the chronological order is obtained, to determine the shape of the graph that has the bump and that corresponds to the any moment, and the graph at the any moment is presented to a user, so that perception of the user on the audio data is enhanced, and user experience is improved.

With reference to the first aspect, in a first possible implementation of the first aspect, the attribute information at the any moment includes frequency information within a time period whose duration is a preset value and in which the any moment is located; and the determining, based on attribute information at any moment of a sound represented by the audio data, a shape of a graph corresponding to the any moment includes:

determining the frequency information; and determining, based on the frequency information, the shape of the graph corresponding to the any moment.

With reference to the first possible implementation of the first aspect, in a second possible implementation of the first aspect, the frequency information includes high-frequency frequency information, intermediate-frequency frequency information, or low-frequency frequency information, where the high-frequency frequency information indicates amplitude information of a high-frequency component of the sound at the any moment, and a frequency of the high-frequency component falls within a preset high-frequency band; the intermediate-frequency frequency information indicates amplitude information of an intermediate-frequency component of the sound at the any moment, and a frequency of the intermediate-frequency component falls within a preset intermediate-frequency band; and the low-frequency frequency information indicates amplitude information of a low-frequency component of the sound at the any moment, and a frequency of the low-frequency component falls within a preset low-frequency band.

The sound represented by the audio data may be divided into bass, middle, and treble based on frequencies of the sound. Each of the bass, the middle, and the treble corresponds to one frequency range. The bumps in the graph are also divided into a low-frequency bump, an intermediate-frequency bump, and a high-frequency bump. The low-frequency bump corresponds to a bump belonging to the frequency range included by the bass, the intermediate-frequency bump corresponds to a bump belonging to the frequency range included by the middle, and the high-frequency bump corresponds to a bump belonging to the frequency range included by the treble.

The bump includes a high-frequency bump, an intermediate-frequency bump, or a low-frequency bump, a maximum distance in distances from points on the high-frequency bump to the center of the graph corresponding to the any moment is positively correlated to a value indicated by the high-frequency frequency information, a maximum distance in distances from points on the intermediate-frequency bump to the center of the graph corresponding to the any moment is positively correlated to a value indicated by the intermediate-frequency frequency information, and a maximum distance in distances from points on the low-frequency bump to the center of the graph corresponding to the any moment is positively correlated to a value indicated by the low-frequency frequency information.

With reference to the first aspect or the first possible implementation of the first aspect, in a third possible implementation of the first aspect, the displaying the graph corresponding to the any moment includes:

displaying a rotating animation in which the graph corresponding to the any moment rotates (or performs rotation), where in the rotating animation, a rotation speed of the graph corresponding to the any moment is obtained based on a play speed of the sound at the any moment, and the rotation speed of the graph corresponding to the any moment is positively correlated to the play speed of the sound at the any moment.

Through rotation of the graph, interaction between the user and the terminal is further increased, and user experience is improved.

With reference to any one of the first aspect to the third possible implementation of the first aspect, in a fourth possible implementation of the first aspect, the sound includes music, and the method further includes:

obtaining a music image, where the music image is used to indicate the music; and displaying the music image within the graph corresponding to the any moment, where the music image falls within the closed curve, and the music image does not intersect the closed curve.

By displaying the music image in the graph, perception of the user on the music image and audio data of music play is improved, and user experience is improved.

With reference to the fourth possible implementation of the first aspect, in a fifth possible implementation of the first aspect, the method further includes:

determining two colors in the music image that occupy a largest area of the music image; and using a gradient color from one of the two colors to the other color as a color of the graph corresponding to the any moment.

An aesthetic degree of the graph is increased by using the color of the graph, and user experience is further improved.

With reference to any one of the first aspect to the fifth possible implementation of the first aspect, in a sixth possible implementation of the first aspect, the method further includes:

playing the audio data in the chronological order, where the any moment is a current moment.

In the foregoing possible implementations, what is specifically described is: when the any moment is the current moment of the audio data that is played in the chronological order, a determined graph is a graph corresponding to a value indicated by the attribute information at the current moment, and the graph at the current moment is displayed to the user. To present a complete dynamically changing graph, a seventh possible implementation of the first aspect further needs to be completed in the method.

With reference to any one of the first aspect to the sixth possible implementation of the first aspect, in the seventh possible implementation of the first aspect, before the determining, based on attribute information at any moment of a sound represented by the audio data, a shape of a graph corresponding to the any moment, the method further includes:

determining, based on attribute information of the sound at a prior moment before the any moment, a shape of a graph corresponding to the prior moment;

before the displaying the graph corresponding to the any moment, the method further includes:

displaying the graph corresponding to the prior moment; and the displaying the graph corresponding to the any moment includes:

displaying an animation in which the graph corresponding to the prior moment changes to the graph corresponding to the any moment.

Attribute information at each moment of the sound represented by the audio data played in the chronological order (or played in continuous time) is obtained, a graph at the corresponding moment is determined based on the attribute information, and an animation in which a graph corresponding to each moment changes is displayed, so that perception of the user on audio data at any moment is increased, and user experience is improved.

With reference to the first aspect to the seventh possible implementation of the first aspect, in an eighth possible implementation of the first aspect, the method is performed by a terminal, and the method further includes:

obtaining a type of the audio data, time information of the audio data, or information about an external environment in which the terminal is located; and determining, based on the type of the audio data, the time information of the audio data, or the information about the external environment in which the terminal is located, a material of the graph corresponding to the any moment.

In this implementation, the time information of the audio data may be, for example, an issue time of music or information about a time at which the music is played last time.

The type of the audio data, the time information, or impact exerted by the external environment on the audio data is embodied by using the material of the graph, and user experience is improved.

With reference to the eighth possible implementation of the first aspect, in a ninth possible implementation of the first aspect, the information about the external environment in which the terminal is located includes weather information, temperature, or humidity of the external environment in which the terminal is located.

With reference to the first aspect, in a tenth possible implementation of the first aspect, the method is performed by a terminal, the audio data is data of a telephone voice from another terminal, and that a maximum distance in distances from points on the bump to a center of the graph corresponding to the any moment is positively correlated to a value indicated by the attribute information at the any moment includes:

the maximum distance is positively correlated to a value obtained by multiplying the value indicated by the attribute information at the any moment by an intimacy coefficient, where the intimacy coefficient is used to indicate a level of intimacy between a user of the terminal and a user of the another terminal, and the intimacy coefficient is obtained based on at least one of a quantity of calls between the terminal and the another terminal, duration of a call between the terminal and the another terminal, information about behavior of refusing to answer an incoming call from the another terminal, information about behavior of adding a number of the another terminal to favorites, information about behavior of creating a contact for the number of the another terminal, and identification information of identifying the number of the another terminal by a number source identification program.

It should be noted that, during implementation of this design solution, the audio data may alternatively be a ring tone when the terminal receives an incoming call from the another terminal. In another design solution, the maximum distance may alternatively be negatively correlated to the value obtained by multiplying the value indicated by the attribute information at the any moment by the intimacy coefficient.

According to a second aspect, an embodiment of the present disclosure provides an information displaying method. The method includes:

obtaining charging attribute information of a terminal at any moment in a charging process;

determining, based on the charging attribute information at the any moment, a shape of a graph corresponding to the any moment, where the graph corresponding to the any moment includes a closed curve with a bump, and a maximum distance in distances from points on the bump to a center of the graph corresponding to the any moment is positively correlated to a value indicated by the charging attribute information at the any moment; and displaying the graph corresponding to the any moment.

The graph is displayed on a screen of the terminal that is being charged, and the shape of the graph is changed based on the charging attribute information, so that the charging process of the terminal is vividly displayed, and user experience is improved.

With reference to the second aspect, in a first possible implementation of the second aspect, the charging attribute information at the any moment includes a charging voltage value of the terminal at the any moment in the charging process or a current value of the terminal at the any moment in the charging process.

With reference to the first possible implementation of the second aspect, in a second possible implementation of the second aspect, the displaying the graph corresponding to the any moment includes:

displaying a rotating animation in which the graph corresponding to the any moment rotates, where in the rotating animation, a rotation speed of the graph corresponding to the any moment is positively correlated to the charging voltage value or the current value, to further improve user experience through rotation of the graph.

With reference to the second aspect to the second possible implementation of the second aspect, in a third possible implementation of the second aspect, the any moment is a current moment.

With reference to the second aspect to the third possible implementation of the second aspect, in a fourth possible implementation of the second aspect, before the determining, based on the charging attribute information at the any moment, a shape of a graph corresponding to the any moment, the method further includes:

determining, based on charging attribute information of the terminal at a prior moment before the any moment in the charging process, a shape of a graph corresponding to the prior moment;

before the displaying the graph corresponding to the any moment, the method further includes:

displaying the graph corresponding to the prior moment; and the displaying the graph corresponding to the any moment includes:

displaying an animation in which the graph corresponding to the prior moment changes to the graph corresponding to the any moment.

A graph at each moment is determined based on the charging attribute information and the determined graph at each moment is dynamically displayed on the terminal, so that user experience is improved.

With reference to the second aspect to the fourth possible implementation of the second aspect, in a fifth possible implementation of the second aspect, the method further includes:

displaying a charging animation in the charging process, where the charging animation includes an animation in which a particle graph appears at a start location on the screen of the terminal and the particle graph moves to a location of the graph corresponding to the any moment and then disappears at the location of the graph corresponding to the any moment, the particle graph is used to represent a charging current of the terminal, the start location is located on a boundary of the screen, the start location and a charging interface of the terminal are located on a same side of a center of the screen, and the start location is located in a plug-in/out direction of the charging interface.

In a design solution, the location of the graph may be set at a central location of the screen of the terminal, and the start location at which the particle graph appears may be set at a location, corresponding to the charging interface, on the screen of the terminal. In this way, the charging process of the terminal can be vividly presented by using an animation in which the particle graph moves to the graph, and user experience is improved.

By displaying, on the screen of the terminal, the particle graph that appears at the start location on the screen corresponding to the charging interface, moves to the location of the graph, and then disappears, the charging process is dynamically embodied, and user experience is improved.

In a design solution, the displaying the animation in which the particle graph moves to the location of the graph corresponding to the any moment and then disappears at the location of the graph corresponding to the any moment includes:

determining, by the terminal, a distance between the particle graph and the graph corresponding to the any moment; and when the distance between the particle graph and the graph corresponding to the any moment satisfies a preset threshold, displaying an animation in which the particle graph disappears, for example, displaying an animation in which the particle graph and the graph corresponding to the any moment are blended.

In another design solution, another graph is displayed at the start location at which the particle graph appears, and a shape of the graph may be a semi-elliptical shape, so that a charging picture is displayed more vividly, and user experience is further improved.

According to a third aspect, an embodiment of the present disclosure provides a terminal. The terminal includes: an obtaining unit, a determining unit, and a display unit.

The obtaining unit is configured to obtain audio data to be played in a chronological order.

The determining unit is configured to determine, based on attribute information at any moment of a sound represented by the audio data, a shape of a graph corresponding to the any moment, where the any moment falls within a range from a start play moment of the sound to an end play moment of the sound, the graph corresponding to the any moment includes a closed curve with a bump, and a maximum distance in distances from points on the bump to a center of the graph corresponding to the any moment is positively correlated to a value indicated by the attribute information at the any moment.

The display unit is configured to display the graph corresponding to the any moment.

Based on a same inventive idea, the terminal provided in the third aspect of the embodiments of the present disclosure may complete the first aspect, the possible implementations of the first aspect, and the beneficial effects brought by the first aspect. For a specific implementation, refer to implementation of the method in the first aspect. For brevity, details are not described herein again.

According to a fourth aspect, an embodiment of the present disclosure provides a terminal. The terminal includes: an obtaining unit, a determining unit, and a display unit.

The obtaining unit is configured to obtain charging attribute information of a terminal at any moment in a charging process.

The determining unit is configured to determine, based on the charging attribute information at the any moment, a shape of a graph corresponding to the any moment, where the graph corresponding to the any moment includes a closed curve with a bump, and a maximum distance in distances from points on the bump to a center of the graph corresponding to the any moment is positively correlated to a value indicated by the charging attribute information at the any moment.

The display unit is configured to display the graph corresponding to the any moment.

The graph is displayed on a screen of the terminal that is being charged, and the shape of the graph is changed based on the charging attribute information, so that the charging process of the terminal is vividly displayed, and user experience is improved.

Based on a same inventive idea, for a problem-resolving principle of the terminal provided in the fourth aspect, and beneficial effects of the fourth aspect, refer to the second aspect, the possible implementations of the second aspect, and the beneficial effects brought by the second aspect. For details, refer to the second aspect and the possible implementations of the second aspect. For brevity, details are not described herein again.

Based on the information displaying method and the terminal provided in the present disclosure, based on the attribute information at the any moment of the sound represented by the obtained audio data played in the chronological order, the shape of the graph including the closed curve with a bump is determined, where the maximum distance in the distances from the points on the bump to the center of the graph corresponding to the any moment is positively correlated to the value indicated by the attribute information at the any moment, to be specific, a larger value indicated by the attribute information at the any moment indicates a larger distance from the point on the bump to the center of the graph corresponding to the any moment; and the graph at the any moment is displayed to a user. Therefore, perception of the user on the attribute information of the audio data is enhanced, interaction between the user and the terminal is enhanced, and user experience is improved.

BRIEF DESCRIPTION OF DRAWINGS

FIG. 26 is a schematic diagram of a graph according to an embodiment of the present disclosure;

FIG. 27 is a flowchart of still another displaying method according to an embodiment of the present disclosure;

DESCRIPTION OF EMBODIMENTS

An information displaying method and a terminal provided in the present disclosure are applicable to most sound-related scenarios, for example, scenarios such as music play, caller ID display, a voice call, recording, noise monitoring, and a voice assistant. In the present disclosure, attribute information of audio data is displayed by using a dynamic graph, so that a user experiences and perceives the attribute information of the audio data by using the dynamic graph, and user experience is improved.

In embodiments of the present disclosure, a terminal obtains played audio data by receiving an instruction of playing the audio data by a user. For example, the user triggers, by using a "play" button on a touchscreen of the terminal, music to start playing, and obtains played audio data or the terminal detects audio data. For example, when performing recording, the terminal detects and obtains to-be-recorded audio data, analyzes attribute information of the obtained audio data, determines, based on a preset rule, a graph corresponding to the attribute information of the audio data, and presents the graph to the user. For audio data played in a chronological order, the terminal presents attribute information of the audio data to the user in a dynamic form, to enhance perception of the user and improve user experience.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
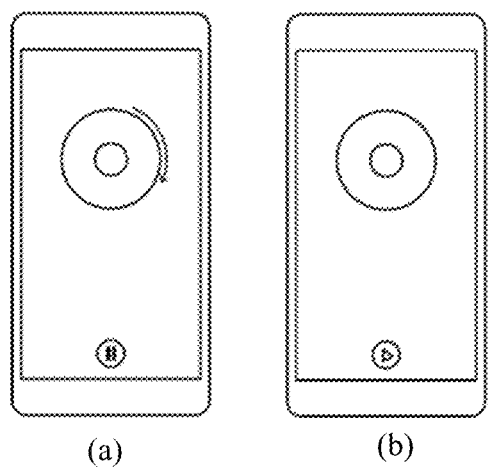
FIG. 1 shows a display interface of a music player in the prior art.
Figure 2:
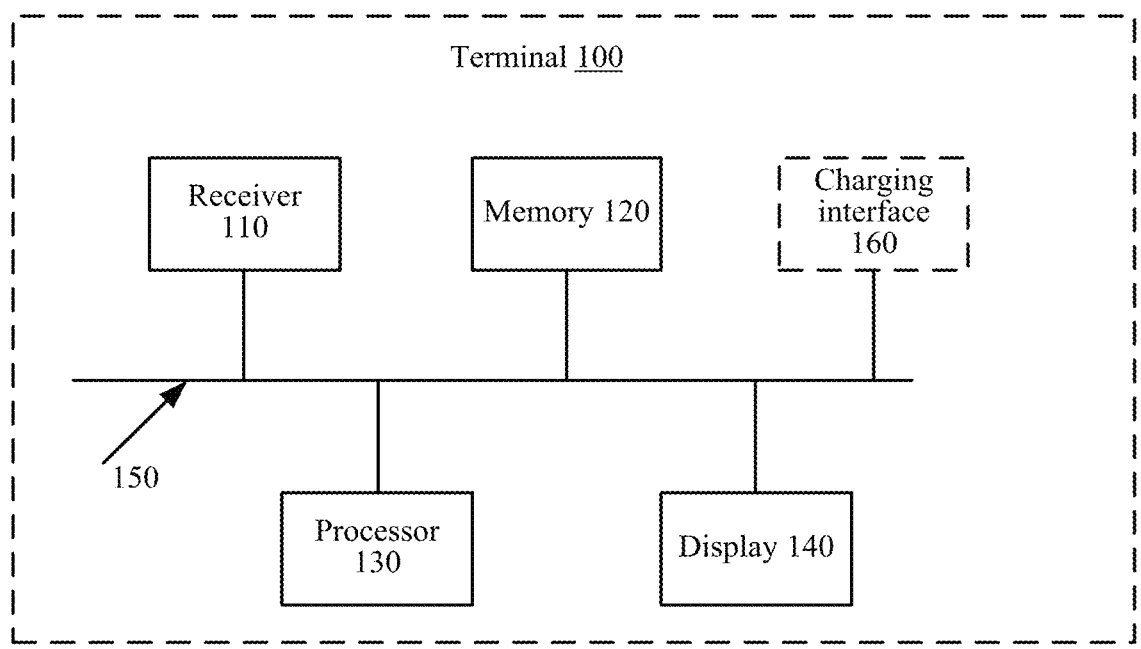
FIG. 2 is a schematic structural diagram of a terminal according to an embodiment of the present disclosure.

FIG. 2 is a schematic structural diagram of a terminal according to an embodiment of the present disclosure.

As shown in FIG. 2, a terminal 100 may include a receiver 110, a memory 120, a processor 130, a display 140, and a communications bus 150. The receiver 110, the memory 120, the processor 130, and the display 140 are connected by using the communications bus 150.

The receiver 110 is configured to receive an instruction entered by a terminal user (or user). The memory 120 is configured to store the instruction and audio data, where the audio data may be audio data stored in advance or may be played audio data obtained by the terminal in real time. The processor 130 is configured to invoke the instruction in the memory 120, and perform a corresponding processing operation on the audio data stored in the memory, so as to obtain, based on a preset rule, attribute information at each moment of audio data played in a chronological order, and determine a graph of the attribute information at the moment. Moreover, the attribute information of the audio data is presented to the user in a picture form by using the display 140.

In this embodiment of the present disclosure, the receiver 110 may be a touch sensor, a microphone, or a communications interface.

The memory 120 may include a read-only memory and a random access memory, and provide the instruction and the audio data to the processor 130. A part of the memory 120 may further include a non-volatile random access memory.

The processor 130 may be a central processing unit (CPU), or the processor 130 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The communications bus 150 includes a control bus, a status signal bus, and the like. However, for purpose of clear description, various buses in the figure are all marked as the communications bus 150.

In addition, the terminal 100 may further include another module or unit, so as to implement more functions, for example, a charging interface 160 used to charge the terminal 100.

For ease of description, technical solutions of the embodiments of the present disclosure are described in detail with reference to FIG. 3. It should be understood that, this is only an example for describing the technical solutions in the embodiments of the present disclosure, and does not constitute any limitation on the embodiments of the present disclosure.

Figure 3:
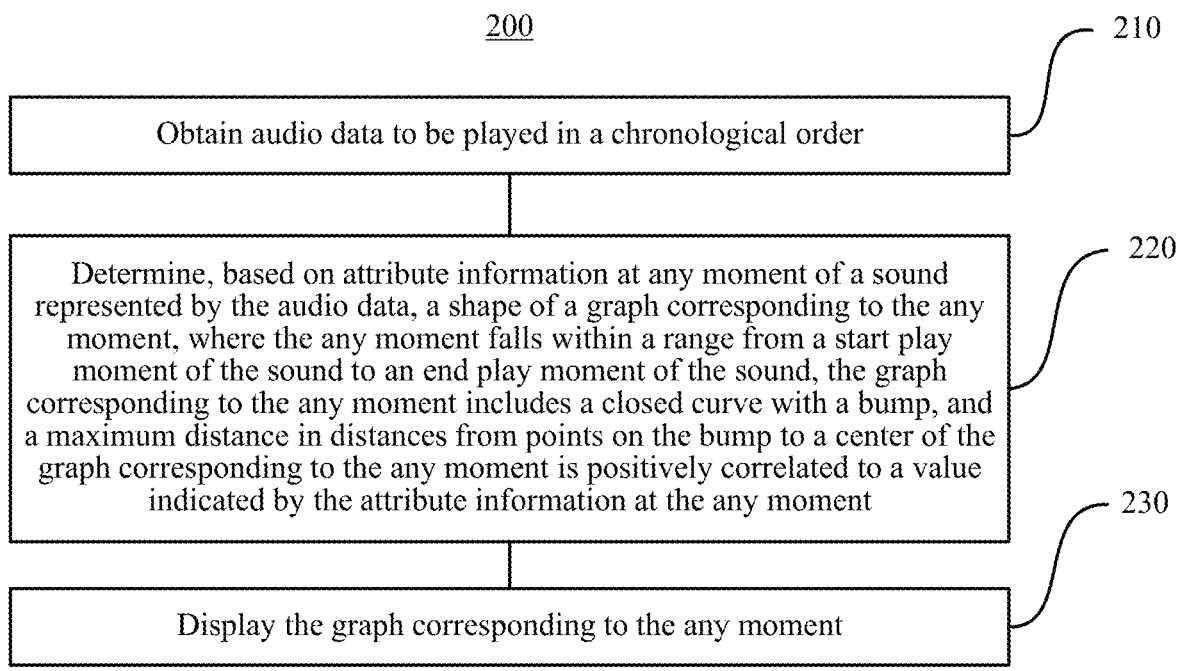
FIG. 3 is a flowchart of a displaying method according to an embodiment of the present disclosure.

FIG. 3 is a flowchart of an information displaying method according to an embodiment of the present disclosure. The method is performed by a terminal. As shown in FIG. 3, the method 200 may include the following steps.

S210. Obtain audio data to be played in a chronological order.

The audio data is data information of all sounds that a person can hear. When the terminal receives instruction information entered by a user by using a touchscreen, for example, tapping a "play" button to play music, the terminal obtains played audio data.

In this embodiment of the present disclosure, the audio data that is played in the chronological order and that is obtained by the terminal may alternatively be audio data obtained in another scenario, for example, audio data obtained in a scenario such as recording, a voice call, or noise monitoring.

S220. Determine, based on attribute information at any moment of a sound represented by the audio data, a shape of a graph corresponding to the any moment, where the any moment falls within a range from a start play moment of the sound to an end play moment of the sound, the graph corresponding to the any moment includes a closed curve with a bump, and a maximum distance in distances from points on the bump to a center of the graph corresponding to the any moment is positively correlated to a value indicated by the attribute information at the any moment.

In this embodiment of the present disclosure, the any moment is a moment in a process of playing the audio data, or may be understood as each moment of the audio data played in the chronological order.

The terminal determines, based on the sound represented by the obtained audio data, the attribute information of the sound at the any moment, and the attribute information may include a frequency of the audio data. The frequency of the audio data may be obtained from the audio data by using an audio formula or obtained through Fourier transform.

It should be noted that, the attribute information of the audio data may further include information such as an amplitude of the sound, a play speed of the sound (or a type of the audio data), or time information of the audio data.

In this embodiment of the present disclosure, the time information of the audio data may include an issue time of the audio data (for example, the issue time of the audio data is June, 2010) and a time at which current audio data is played or used last time (for example, January, 2016).

The terminal determines, based on the attribute information of the sound at the any moment, a shape of the graph with the bump. In this case, the terminal determines, based on attribute information at each moment of the sound represented by the audio data played in the chronological order, a shape of a graph corresponding to each moment.

In this embodiment of the present disclosure, preferably, the shape of the graph at the any moment may be a shape that approximates a circle and that has a bump, and the shape of the graph may be more vividly described as a circle with a lace.

In this embodiment of the present disclosure, in the graph at the any moment, a maximum distance from a point on the bump to a location of a central point of the graph at the any moment is positively correlated to a value indicated by the attribute information at the corresponding moment. To be specific, for example, a larger frequency value of the sound indicates a larger maximum value of the distance from the point on the bump to the center of the graph; and a smaller frequency value of the sound indicates a smaller maximum value of the distance from the point on the bump to the center of the graph.

It should be noted that, the center of the graph is a location of a preset value on a screen of the terminal, or may be a center of an inscribed circle of the graph with the bump. The inscribed circle herein is only intended to describe the center of the graph, and is a vivid description manner. A line of the inscribed circle of the graph does not exist or is not displayed in the graph.

In this embodiment of the present disclosure, a maximum value of the distance from the point on the bump to the center of the graph may alternatively be determined based on another condition. For example, when the terminal is a mobile phone and the mobile phone has an incoming call, the mobile phone determines information about a relationship between a calling party and an owner of the mobile phone (which may include an intimate relationship, an ordinary relationship, or a stranger relationship) to determine the maximum value of the distance from the bump to the center of the graph. In this embodiment of the present disclosure, the maximum value of the distance from the point on the bump to the center of the graph may be positively correlated to or negatively correlated to the relationship information.

For example, the maximum value in the distances from the points on the bump to the center of the graph may be positively correlated to the relationship information. A maximum value of the distance from the point on the bump to the center of the graph when the relationship information is the stranger relationship is greater than a maximum value of the distance from the point on the bump to the center of the graph when the relationship information is the intimate relationship; or a maximum value of the distance from the point on the bump to the center of the graph when the relationship information is the stranger relationship is between a maximum value of the distance from the point on the bump to the center of the graph when the relationship information is the intimate relationship and a maximum value of the distance from the point on the bump to the center of the graph when the relationship information is the stranger relationship.

It should be noted that, using an example in which the relationship between the calling party and the owner of the mobile phone includes the intimate relationship, the ordinary relationship, and the stranger relationship, and the maximum value of the distance from the point on the bump to the center of the graph is positively correlated to or is negatively correlated to the relationship information, a technical solution of the present disclosure is described. In this embodiment of the present disclosure, content or a class included in the relationship information, and a relationship between the relationship information and the maximum value of the distance from the point on the bump to the center of the graph may be set based on a need. This is not limited in the present disclosure.

S230. Display the graph corresponding to the any moment.

The terminal displays the shape of the graph determined at the any moment based on the sound in S220. To be specific, the terminal displays a shape of a graph at each moment determined based on attribute information at each moment determined based on the sound represented by the audio data played in the chronological order, in other words, displays an animation in which the graph changes at each moment.

Based on the information displaying method provided in this embodiment of the present disclosure, the audio data played in the chronological order is obtained, the shape of the graph at the any moment is determined based on the attribute information at the any moment of the sound represented by the audio data, and the graph determined based on the audio data played in the chronological order is displayed, in other words, the animation of the graph corresponding to the audio data played in the chronological order is presented, to add a three-dimensional feeling of the audio data visually or in a dynamic form, and improve user experience.

It should be noted that, before the shape of the graph is determined based on the attribute information of the sound, the graph and a rule according to which the graph changes based on the attribute information at the any moment of the sound represented by the audio data need to be preset, so that when a corresponding application or system function (for example, "incoming call") is used, the specified graph and the specified rule according to which the graph changes based on the attribute information at the any moment of the sound represented by the audio data are used to embody the attribute information of the audio data, thereby improving perception and experience of the user on the attribute information of the sound represented by the audio data, and improving user experience.

Figure 4:
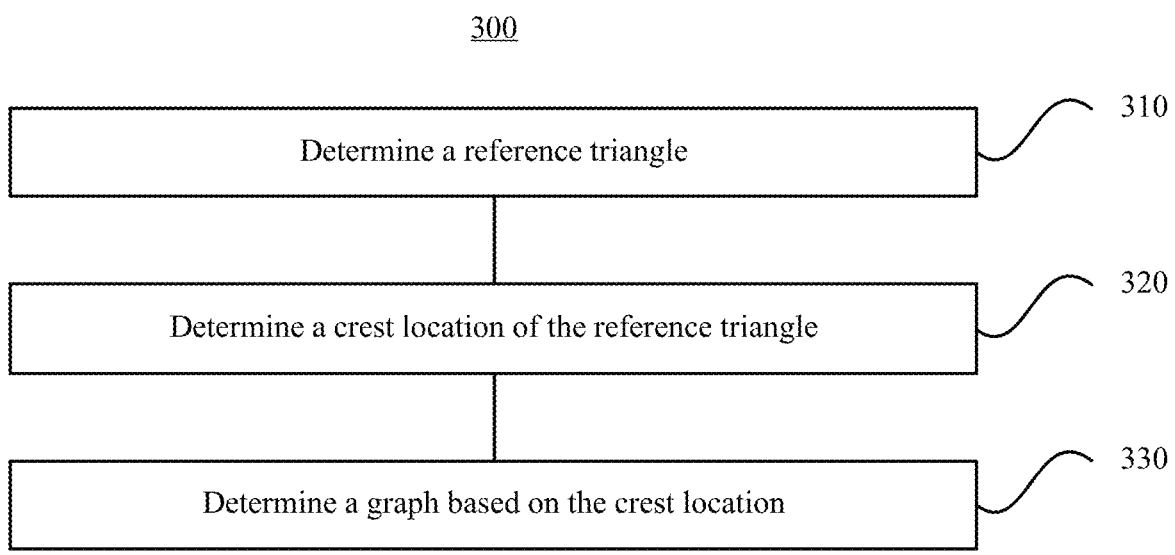
FIG. 4 is a flowchart of a graph determining method according to an embodiment of the present disclosure.

As shown in FIG. 4, a graph setting method 300 may include the following steps.

S310. Determine a reference triangle.

Figure 5:
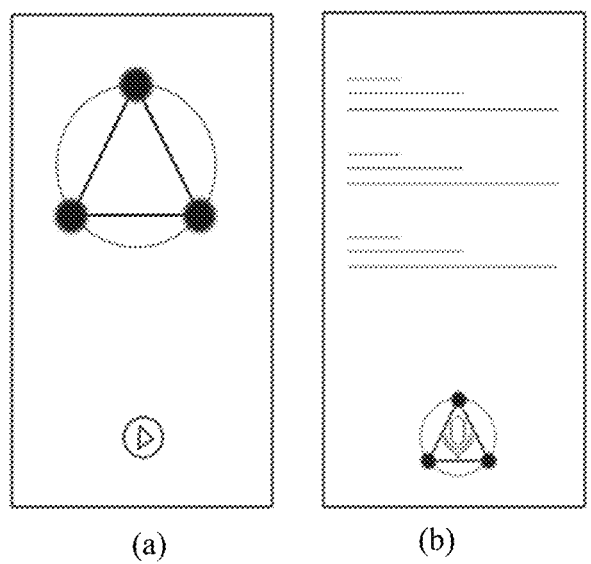
FIG. 5 is a schematic diagram of reference triangles of a music player and a voice assistant according to an embodiment of the present disclosure.

A circle generated by using a center of a related part reserved by an application as a circle center and using a boundary of the reserved part as a radius is used as a reference. For ease of description, the circle is referred to as a first circle, and an equilateral triangle is determined. For example, FIG. 5 shows a music player and a voice assistant. In an interface of the music player, a center location of a music disc image is used as a center of a to-be-determined reference triangle, and a radius of the music disc image is used as a radius, to determine an equilateral triangle.

It should be noted that, in this embodiment, a center of a triangle is an origin, and an angle of the triangle may be any value. In other words, the triangle may be set to any angle, and is unnecessarily a triangle that is shown in FIG. 5 and whose base is horizontal.

It should be further noted that, in this embodiment of the present disclosure, an equilateral triangle is determined, and this is a solution for implementing the solution. In this embodiment of the present disclosure, another polygon such as a quadrangle may be alternatively determined. However, if another polygon is used, and a finally determined graph with bumps has an excessively large quantity of bumps, when a terminal determines a shape of a graph at any moment based on attribute information at the any moment of a sound represented by audio data, because the graph has an excessively large quantity of bumps, the bumps in the graph do not change obviously; or when a terminal determines a shape of a graph based on attribute information of a sound represented by audio data played in a chronological order and the terminal displays an animation in which the graph changes, the graph does not change obviously. Consequently, it is difficult for a user to perceive the attribute information of the audio data by using a displayed dynamic graph, thereby causing poor user experience.

S320. Determine a crest location.

In this embodiment of the present disclosure, a highest point of a triangle is referred to as a crest. Based on a frequency of the sound represented by the audio data, the sound may be divided into three parts: bass, middle, and treble. A frequency range within which the bass falls is 20 Hz to 20 Hz; a frequency range within which the middle falls is 250 Hz to 4000 Hz; and a range within which the treble falls is 4 kHz to 20 kHz.

Figure 6:
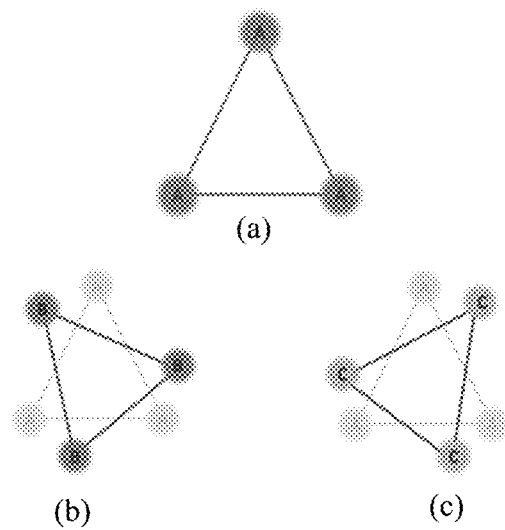
FIG. 6 is a schematic diagram of crest locations of bass, middle, and treble obtained through division performed based on a frequency of audio data according to an embodiment of the present disclosure.

In this embodiment of the present disclosure, the bass may be used as a reference (as shown in FIG. 6(a)), a center of a triangle may be used as an origin, and the triangle is rotated anticlockwise by 60 degrees to indicate the middle, and is rotated clockwise by 60 degrees to indicate the treble, as shown in FIG. 6. For ease of distinguishing, in FIG. 6, a highest point of a triangle indicating the bass is indicated by using a letter "A", the middle is indicated by using a letter "B", and the treble is indicated by using a letter "C".

S330. Determine a graph.

Figure 7:
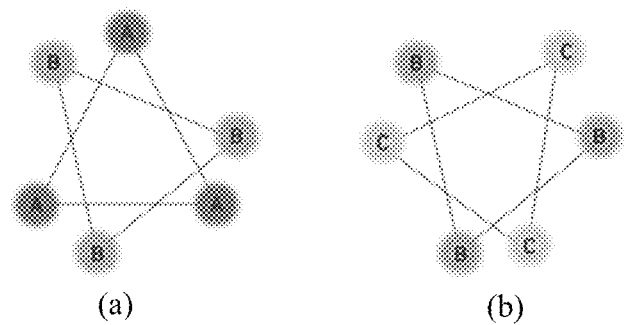
FIG. 7 is a schematic diagram of a first graph and a second graph determined based on bass, middle, and treble obtained through division performed based on a frequency of audio data according to an embodiment of the present disclosure.

In this embodiment of the present disclosure, based on what is shown in FIG. 6, a bass part and a middle part may be grouped into a layer (A+B=Group1), and the middle part and a treble part may be grouped into a layer (B+C=Group2), as shown in FIG. 7. In a process of combining the bass and the middle, and combining the middle and the treble, triangles may be superposed by using centers of the triangles as a central point, and a superposing angle of two triangles may be set to any value.

Figure 8:
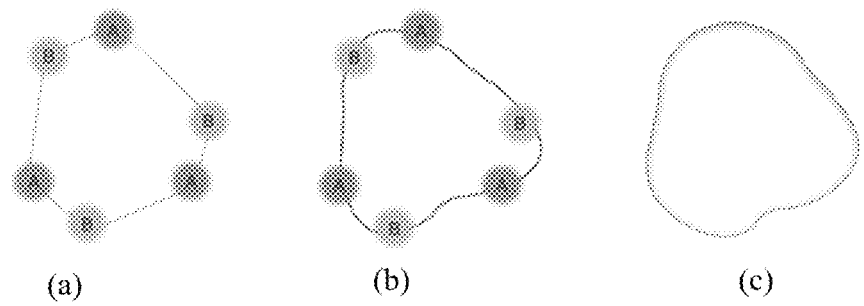
FIG. 8 is a schematic diagram of drawing a first graph according to an embodiment of the present disclosure.
Figure 9:
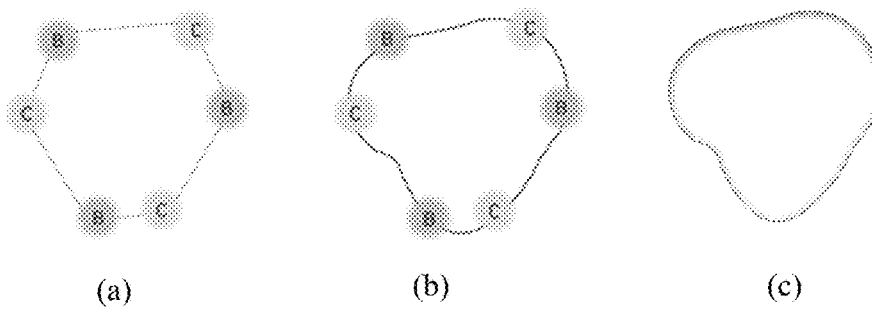
FIG. 9 is a schematic diagram of drawing a second graph according to an embodiment of the present disclosure.

For graphs shown in FIG. 8 and FIG. 9, crests in the graph are connected by using lines (as shown in FIG. 8(a) and FIG. 9(a)), to draw a closed smooth curve (as shown in FIG. 8(b) and FIG. 9(b)), and the curve has bumps and depressions.

In this embodiment of the present disclosure, it may be stipulated that when a connecting distance between two crests is relatively small (or relatively close), a closed curve drawn by using the two crests is a bump, and when a connecting distance between two crests is relatively large (or relatively far), a closed curve drawn by using the two crests is a depression.

It should be noted that, in this embodiment of the present disclosure, it may be alternatively stipulated that when a connecting distance between two crests is relatively large, a closed curve drawn by using the two crests is a bump, and when a connecting distance between two crests is relatively small, a closed curve drawn by using the two crests is a depression. This is not limited in this embodiment of the present disclosure.

When the graph is drawn, it may be set that a bump and a depression of the graph satisfy a condition, for example, it is set that a distance from an edge of the depression in the graph to a central point of the graph needs to be less than a distance from an edge of the bump to the central point of the graph and the bump and the depression need to change (or fluctuate) within a specified threshold range, and this may be similar to setting a range from a maximum value to a minimum value of a distance from a point on the bump in the graph to the center of the graph, in other words, a changing range of the point on the bump in a graph change.

In this embodiment of the present disclosure, a graph drawn based on Group1 is referred to as a first graph (as shown in FIG. 8(c)), and a graph drawn based on Group2 is referred to as a second graph (as shown in FIG. 9(c)).

Preferably, in this embodiment of the present disclosure, inner glow and outer glow of a specific threshold (which is preferably 15%) and ambiguity of a specific threshold (which is preferably 12%) may be set for the drawn first graph and second graph. A location of inner glow is within an edge of a graph, or a location of a side close to a center of a graph is close to an edge of the graph; and a location of outer glow is beyond the edge of the graph, or a location of a side away from the center of the graph is connected to the edge of the graph.

In this embodiment of the present disclosure, transparency processing may be further performed on the drawn first graph and second graph. Transparency herein is referred to as an alpha (Alpha) channel, and means that transparency and translucency of a picture affect an effect of overlapping between the picture and another picture (or a background picture). In this embodiment of the present disclosure, preferably, transparency of the first graph is 50%, and transparency of the second graph is 100%.

Figure 10:
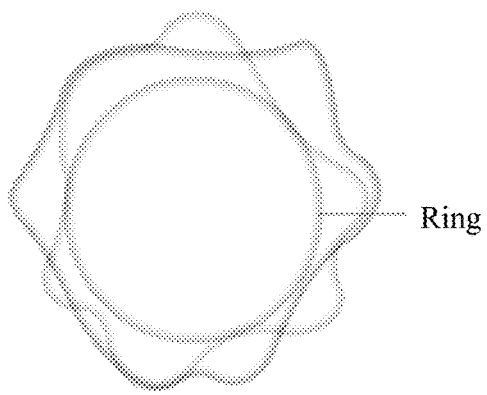
FIG. 10 is a schematic diagram of covering a first graph and a second graph with a ring according to an embodiment of the present disclosure.

The drawn first graph and second graph are superposed and combined by using circle centers of the first graph and the second graph as a central point. In this embodiment of the present disclosure, a ring having same graph attributes as those of the first graph and the second graph (the ring is preferably a circle) may be disposed (added, used as a cover, or superposed) on the first graph and the second graph that are superposed and combined, as shown in FIG. 10. The graph attributes herein are inner glow, outer glow, transparency, and ambiguity of a graph. In this embodiment of the present disclosure, the ring may be a circular ring, an elliptical ring, or another smooth graph ring approximating a circle.

In this embodiment of the present disclosure, the ring disposed on the first graph and the second graph may be the foregoing inscribed circle of the vividly described graph. Using the music player as an example, when music is not played, the ring may be displayed, to improve user experience.

Using the music player as an example, a picture (or a music image) is disposed (added, used as a cover, or superposed) on the ring covering the first graph and the second graph. The picture may be a picture that is used to identify a particular song and that is displayed on a play screen when a program of the music player is playing music, and is usually referred to as a song album cover picture. In this embodiment of the present disclosure, a shape of the picture may be set to a circle (a first circle), as shown in FIG. 11.

Figure 11:
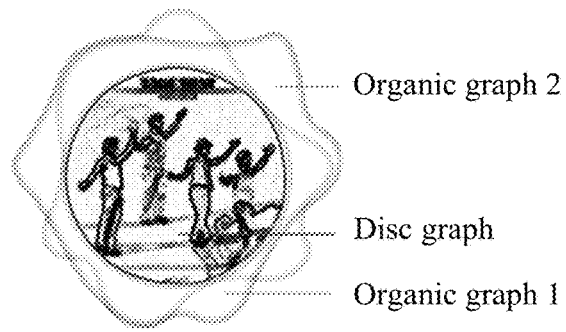
FIG. 11 is a schematic diagram of covering a first graph and a second graph with a picture according to an embodiment of the present disclosure.

In this embodiment of the present disclosure, a radius of the first circle is less than a radius of the ring disposed on the first graph and the second graph, as shown in FIG. 11. Preferably, the radius of the ring may be set to be equal to 105% of the radius of the first circle.

Alternatively, a radius of the inscribed circle of the graph is greater than the radius of the first circle, to be specific, a radius of an inscribed circle of a graph formed after the first graph and the second graph are superposed is greater than the radius of the first circle. The inscribed circle is a circle determined by using a circle center of the reference triangle in S310 as a circle center and using a distance from the circle center to a lowest point of a depression of the graph as a radius.

It should be noted that, in this embodiment of the present disclosure, there are preferably two graphs: the first graph and the second graph. In this embodiment of the present disclosure, a quantity of graphs may be alternatively set to one, three, or more. This is not limited in this embodiment of the present disclosure.

A graph is set in the manner shown in FIG. 4, so that the terminal determines a shape of the graph based on attribute information of a sound represented by audio data.

In this embodiment of the present disclosure, for ease of description, one or more specified graphs may be collectively referred to as a graph.

Figure 12:
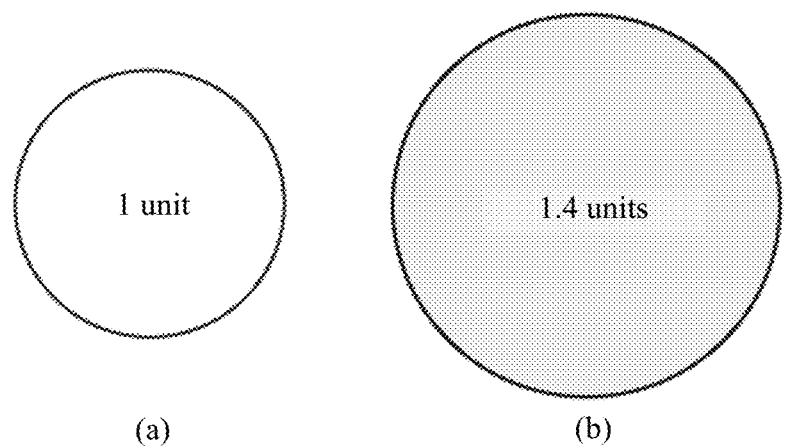
FIG. 12 is a schematic diagram of a reference circle and a circle in which a maximum value of fluctuation of a bump in a graph is located according to an embodiment of the present disclosure.
Figure 13:
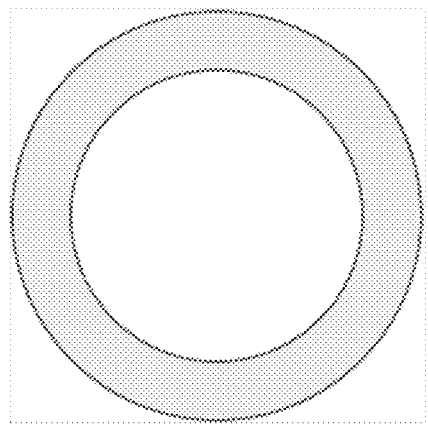
FIG. 13 is a schematic diagram of a fluctuation range of a bump in a graph according to an embodiment of the present disclosure.

Optionally, in another embodiment of the present disclosure, a rule according to which a graph changes based on attribute information of a sound represented by audio data may be set based on different applications. For example, using FIG. 10 as an example, when there is a sound, the sound corresponds to a different shape of a graph at each moment, or a graph presented by a terminal to a user based on attribute information corresponding to the sound is changing, to be specific, bumps in the graph are changing (fluctuating, or fluctuating and rotating). Among a plurality of bumps of the graph, only one primary bump, or referred to as a main peak, is set, to be specific, among the bumps, there is only one bump having a largest maximum value of a distance from a bump point to a central point of the graph. For brevity, a dynamic change in the graph may be referred to as fluctuation of the graph, a maximum value and a minimum value of the distance from the bump point to the center of the graph are referred to as a fluctuation range of the bump, and a distance from a point on a bump to the center of the graph is referred to as a fluctuation amplitude. In this way, when the graph is changing, fluctuation amplitudes of the graph are different from each other. A size of a ring (a second circle) that is set in an application is set as a reference for fluctuation of a bump within the fluctuation range, the size of the ring is set to 1 unit, and a size of a circle for the maximum value of the distance from the point on the bump to the center of the graph is preferably 1.4 units, as shown in FIG. 12. Therefore, a minimum value of the distance from the point on the bump to the center of the graph and the maximum value of the distance from the point on the bump to the center of the graph fluctuate between 1 unit and 1.4 units of the circle, in other words, a fluctuation range of the bump in the graph is 1 unit to 1.4 units, as shown in FIG. 13.

Optionally, in this embodiment of the present disclosure, it may be stipulated that an initial angle by which the graph rotates is 0, an initial rotation location is random, and a rotation speed is a rotation angle of 6 degrees per second.

Preferably, in another embodiment of the present disclosure, it may be stipulated that the rotation speed of the graph is in a direct proportion to a play speed of a sound.

The play speed of the sound may be determined based on an audio type. For example, using music as an example, if the music is quick rhythm music, a play speed of the music is high, and if the music is slow rhythm music, a play speed of the music is low. When the play speed of the sound is high, the rotation speed of the graph is high, and when the play speed of the sound is low, the rotation speed of the graph is low.

From the perspective of presentation effects, when some quick songs are played, a rotation speed of a graph displayed by the terminal is relatively high, and when some relatively soothing songs are played, a rotation speed of a graph displayed by the terminal is relatively low.

By using a preset graph and a preset rule according to which the graph changes based on attribute information of a sound represented by audio data, only when obtaining audio data played in a chronological order, the terminal can display a change in the graph in an animation form, and present attribute information at each moment of the sound represented by the audio data to the user, so that the user vividly perceives a change in the attribute information of the sound represented by the audio data, to improve user experience visually and in the animation form.

Optionally, in another embodiment of the present disclosure, the attribute information at the any moment may include frequency information within a time period whose duration is a preset value and in which the any moment is located.

The determining, based on attribute information at any moment of a sound represented by the audio data, a shape of a graph corresponding to the any moment includes:

obtaining, by the terminal, frequency information; and determining, based on the frequency information, the shape of the graph corresponding to the any moment.

The frequency information at the any moment of the sound represented by the audio data determined by the terminal based on the obtained audio data played in the chronological order needs to be determined by the terminal based on frequency information of a sound represented by audio data in a period of time in the obtained audio data. When obtaining the frequency information at the any moment of the sound represented by the audio data, the terminal determines, based on the frequency information at the any moment, the shape of the graph corresponding to the any moment.

Optionally, in another embodiment of the present disclosure, the frequency information may include high-frequency frequency information, intermediate-frequency frequency information, or low-frequency frequency information. The high-frequency frequency information indicates amplitude information of a high-frequency component of the sound at the any moment, and a frequency of the high-frequency component falls within a preset high-frequency band; the intermediate-frequency frequency information indicates amplitude information of an intermediate-frequency component of the sound at the any moment, and a frequency of the intermediate-frequency component falls within a preset intermediate-frequency band; and the low-frequency frequency information indicates amplitude information of a low-frequency component of the sound at the any moment, and a frequency of the low-frequency component falls within a preset low-frequency band.

The bump includes a high-frequency bump, an intermediate-frequency bump, or a low-frequency bump, a maximum distance in distances from points on the high-frequency bump to the center of the graph corresponding to the any moment is positively correlated to a value indicated by the high-frequency frequency information, a maximum distance in distances from points on the intermediate-frequency bump to the center of the graph corresponding to the any moment is positively correlated to a value indicated by the intermediate-frequency frequency information, and a maximum distance in distances from points on the low-frequency bump to the center of the graph corresponding to the any moment is positively correlated to a value indicated by the low-frequency frequency information.

In other words, the terminal obtains component values corresponding to different frequencies, and the component value indicates a phase spectrum value obtained by the terminal by calculating frequency domain data through Fourier transform.

The sound represented by the audio data may be divided into bass, middle, and treble based on frequencies of the sound. Each of the bass, the middle, and the treble corresponds to a frequency range. The bumps in the graph are also divided into a low-frequency bump, an intermediate-frequency bump, and a high-frequency bump. The low-frequency bump corresponds to a bump belonging to the frequency range included by the bass, the intermediate-frequency bump corresponds to a bump belonging to the frequency range included by the middle, and the high-frequency bump corresponds to a bump belonging to the frequency range included by the treble.

A maximum distance in distances from points on the low-frequency bump to the center of the graph corresponding to the any moment is positively correlated to a frequency value of the frequency range corresponding to the bass. To be specific, a larger frequency value of the frequency range corresponding to the bass indicates a larger value of the maximum distance in the distances from the points on the low-frequency bump to the center of the graph corresponding to the any moment, and a smaller frequency value of the frequency range corresponding to the bass indicates a smaller value of the maximum distance in the distances from the points on the low-frequency bump to the center of the graph corresponding to the any moment. A maximum distance in distances from points on the intermediate-frequency bump to the center of the graph corresponding to the any moment is positively correlated to a value indicated by the intermediate-frequency frequency information. To be specific, a larger frequency value of the frequency range corresponding to the middle indicates a larger value of the maximum distance in the distances from the points on the intermediate-frequency bump to the center of the graph corresponding to the any moment, and a smaller frequency value of the frequency range corresponding to the middle indicates a smaller value of the maximum distance in the distances from the points on the intermediate-frequency bump to the center of the graph corresponding to the any moment.

A maximum distance in distances from points on the high-frequency bump to the center of the graph corresponding to the any moment is positively correlated to a value indicated by the high-frequency frequency information. To be specific, a larger frequency value of the frequency range corresponding to the treble indicates a larger value of the maximum distance in the distances from the points on the high-frequency bump to the center of the graph corresponding to the any moment, and a smaller frequency value of the frequency range corresponding to the treble indicates a smaller value of the maximum distance in the distances from the points on the high-frequency bump to the center of the graph corresponding to the any moment.

In another embodiment of the present disclosure, the displaying the graph corresponding to the any moment includes:

displaying a rotating animation in which the graph corresponding to the any moment rotates, where in the rotating animation, a rotation speed of the graph corresponding to the any moment is obtained based on a play speed of the sound at the any moment, and the rotation speed of the graph corresponding to the any moment is positively correlated to the play speed of the sound at the any moment.

In this embodiment of the present disclosure, the terminal obtains audio data, determines a type of the audio data based on the audio data, and determines, based on the type of the audio data, a play speed of a sound represented by the audio data. For example, using music as an example, when played music is quick rhythm music, a play speed of the sound is high, and when played music is slow rhythm music, a play speed of the sound is low.

The terminal determines a rotation speed of a displayed graph at any moment based on the play speed of the sound. A higher play speed of the sound indicates a higher rotation speed of the displayed graph at the any moment, and a lower play speed of the sound indicates a lower rotation speed of the displayed graph at the any moment.

Optionally, in another embodiment of the present disclosure, the terminal may determine a shape of a graph based on a type of audio data. The shape of the graph is determined based on the type of the audio data including that a sound represented by the audio data is quick rhythm music or slow rhythm music, for example, resounding music or soothing music. For the resounding music, sounds are usually sonorous and high-spirited, a speaking mode is usually of a tide generation type, peaks are close to each other, the sounds are increasingly loud, and a speaking speed is slightly high; and the soothing music is characterized in that sounds are usually clear, a speaking mode has ups and downs but is mostly gentle and unfolded, and a speaking speed is low.

Figure 14:
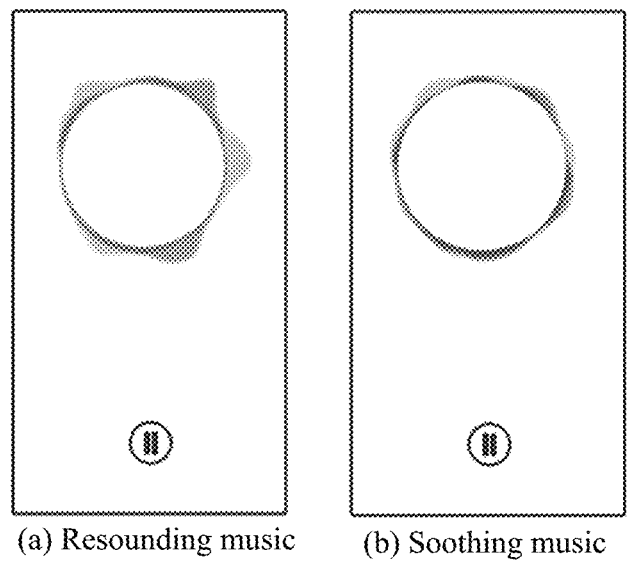
FIG. 14 is a schematic diagram of changes in graphs determined based on two different music types according to an embodiment of the present disclosure.

Different audio data has different moods. For example, the resounding type is passionate, and light music is peaceful and soothing. Therefore, to embody the different moods of the audio data, a fluctuation amplitude of bumps in a graph may be further determined based on types of the audio data. When played music belongs to the resounding type that is a music type having quick rhythm, a graph change in a graph is relatively large, in other words, bump parts in the graph are relatively prominent; and when played music belongs to the soothing type that is a music type having light and slow rhythm, a change in a graph is relatively small, in other words, bump parts in the graph are relatively placid, as shown in FIG. 14.

Optionally, in another embodiment of the present disclosure, when the sound represented by the audio data is music, the method may further include:

obtaining, by the terminal, a music image, where the music image is used to indicate the music; and displaying the music image within the graph corresponding to the any moment, where the music image falls within the closed curve, and the music image does not intersect the closed curve.

In other words, the music image is the corresponding picture in FIG. 11. The music image is displayed in the graph, and does not intersect the closed curve forming the graph. In other words, when the music image is a circle, a radius of the music image is less than a radius of an inscribed circle of the graph. The inscribed circle of the graph herein is the same as the inscribed circle of the graph described above. For brevity, details are not described herein again.

Optionally, in another embodiment of the present disclosure, the method further includes:

determining, by the terminal, two colors in the music image that occupy a largest area of the music image, and using a gradient color from one of the two colors to the other color as a color of the graph corresponding to the any moment.

The terminal may determine, from the music image, the two colors occupying the largest area as colors of the graph. One of the two colors is used as a start color, the other color is used as an end color, and a color of the graph is set to a gradient color from the start color to the end color.

The music player is used as an example for description below. A color of the graph is obtained from colors of the music image, a warm color in the music image is usually preferably taken (in the prior art, color values of a preset quantity of main colors of any picture may be obtained, and the color values are usually defined by RGB values, where R (Red) is red, G (Green) is green, and B (Blue) is blue; and when an R value of a color is greater than both a G value and a B value, the color is a warm color), two colors having a largest warm color area are taken as colors of the graph, and the graph is filled with the selected two colors according to a preset rule.

Alternatively, the terminal extracts two specified colors such as a vibrant color and a light vibrant color from a cover picture by extracting a tool library (which includes six extractable colors such as a vibrant color, a muted color, a dark vibrant color, a dark muted color, a light vibrant color, and a light muted color that may be divided into a vibrant color and a muted color). When the two specified colors fail to be extracted, a default value c7c7c6 is used, c7c7c6 is defined gray, and usually, the two colors, namely, the vibrant color and the light vibrant color can be extracted; and after the two colors, namely, the vibrant color and the light vibrant color are extracted, the graph is filled according to a specified rule.

In this embodiment of the present disclosure, a rule of filling a graph with two colors may be set as follows: One color is a start color, the other color is an end color, and gradient filling is first performed by an angle of 45 degrees from upper right to lower left.

It should be noted that, in this embodiment of the present disclosure, the rule of filling a graph with two colors includes a filling direction, an angle, and a gradient form, and is only an example. In this embodiment of the present disclosure, another filling rule may be designed based on a requirement or an intention. This is not limited in this embodiment of the present disclosure.

It should be further noted that, in this embodiment of the present disclosure, a color of the graph may be alternatively obtained from the music image in another defined manner. This is not limited in this embodiment of the present disclosure either.

In addition, in this embodiment of the present disclosure, a color of the graph may be alternatively predefined by using an existing technical means.

Based on the solution provided in this embodiment of the present disclosure, user experience can be improved from the perspective of a color of the graph.

Optionally, in another embodiment of the present disclosure, the method may further include:

determining a color of outer glow of the graph based on a color of the music image or an external environment.

If characteristics of inner glow and outer glow of the graph are set in a preset process, the terminal may further determine colors of the inner glow and the outer glow of the graph by using the color of the music image. For example, when the color of the music image is a warm color, to be specific, an R value of an RGB value of the color is greater than a G value and a B value, the terminal presets several specific warm colors (for example, red and orange), and the terminal may select one color from the preset colors based on the color of the music image for presentation; and when the color of the music image is a cool color, to be specific, a G value, a B value, or a G value and a B value in an RGB value of the color are greater than an R value, the terminal presets several particular cool colors (for example, green and blue), and the terminal may select one color from the preset colors based on the color of the music image for presentation.

It should be noted that, in this embodiment of the present disclosure, the colors of the inner glow and the outer glow of the graph may be alternatively determined by using another preset rule. This is not limited in this embodiment of the present disclosure.

Optionally, the terminal may further determine the color of the graph or/and the colors of the inner glow and the outer glow of the graph based on an external environment, for example, a condition such as a weather situation or a temperature value. For example, when temperature is higher than preset temperature, the color of the graph may be set to a warm color, and when temperature is lower than preset temperature, the color of the graph may be set to a cool color.

In this embodiment of the present disclosure, user experience is further improved by using the color of the graph and/or the colors of the inner glow and the outer glow of the graph.

In this embodiment of the present disclosure, the method further includes:

playing the audio data in the chronological order, where the any moment is a current moment.

The terminal obtains, in real time, the audio data played in the chronological order, determines a shape of a graph at the current moment based on the sound represented by the obtained audio data, and displays the graph at the current moment, so that the terminal displays, in real time, the graph of the attribute information of the sound represented by the audio data, and presents the attribute information of the sound represented by the played audio data to the user in real time, thereby improving user experience.

Optionally, in another embodiment of the present disclosure, before the determining, based on attribute information at any moment of a sound represented by the audio data, a shape of a graph corresponding to the any moment, the method further includes:

determining, based on attribute information of the sound at a prior moment before the any moment, a shape of a graph corresponding to the prior moment;

before the displaying the graph corresponding to the any moment, the method may further include:

displaying the graph corresponding to the prior moment; and the displaying the graph corresponding to the any moment includes:

displaying an animation in which the graph corresponding to the prior moment changes to the graph corresponding to the any moment.

Optionally, in another embodiment of the present disclosure, the method is performed by a terminal, and the method may further include:

obtaining a type of the audio data, time information of the audio data, or information about an external environment in which the terminal is located; and determining, based on the type of the audio data, the time information of the audio data, or the information about the external environment in which the terminal is located, a material of the graph corresponding to the any moment.

Figure 15:
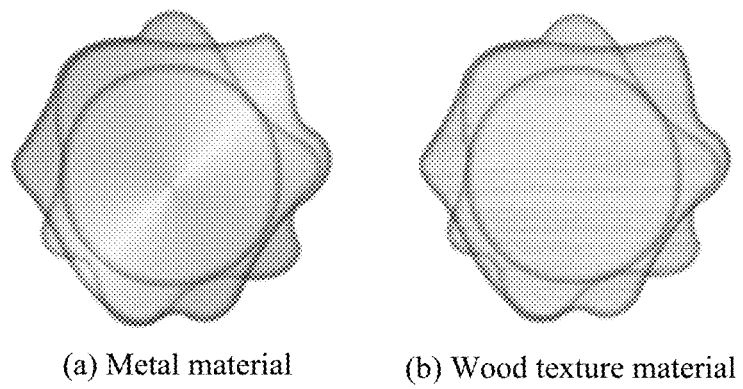
FIG. 15 is a schematic diagram of graphs of two different materials according to an embodiment of the present disclosure.

Different audio data has different moods. For example, rock and roll music is passionate, and light music is peaceful and soothing, bringing different music perception to the user. Therefore, to embody types of the audio data, different materials may be set for the graph based on the types of the audio data. For example, when music is rock and roll music that has a metal property, a material of the graph is a metal material, and when music is classical music, a material of the graph may be set to wood texture, another material characterized by nostalgia, or the like, as shown in FIG. 15. When classical music is played, the terminal determines that the material of the graph is wood texture or another material.

Optionally, the terminal may further determine the material of the graph based on the time information of the audio data. For example, the sound represented by the audio data is music, and two pieces of time information of the music may be included: an issue time of the music and a time at which the terminal plays (or uses) the music last time.

Figure 16:
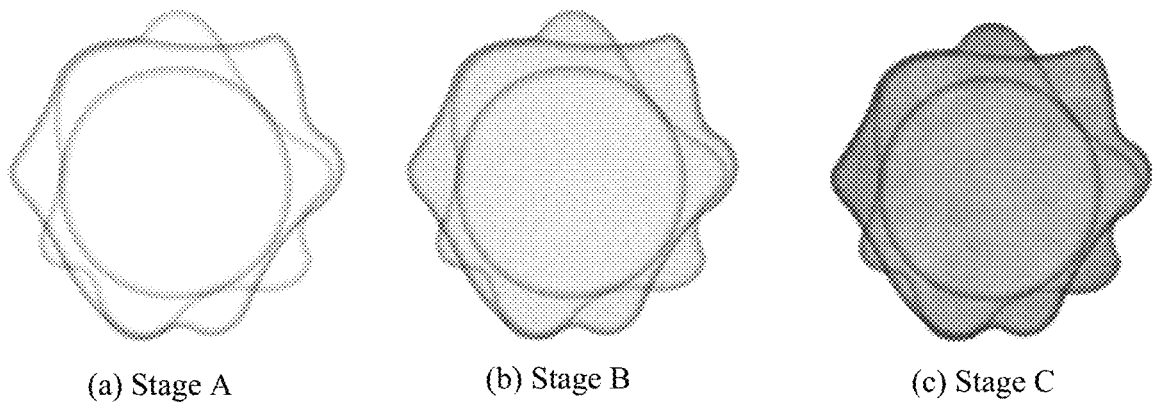
FIG. 16 is a schematic structural diagram of three graph materials determined based on time information of audio data according to an embodiment of the present disclosure.

Based on the issue time of the music, the terminal may preset a period of time (for example, the issue time of the music is "date"), a current date is used as a reference, and three periods of time are set. For example, at a stage A, the date is less than or equal to three years (date≤3 years); at a stage B, the date is between three years and six years (3 years<date<6 years); and at a stage C, the date is greater than or equal to six years (date≥6 years). Using July, 2016 as an example, when the issue time of the music is at the stage A, to be specific, at July, 2013 or before July, 2013, the material of the graph may be set to a material whose color is relatively fresh and bright; when the issue time of the music is at the stage B, to be specific, between August, 2010 and August, 2013, the material of the graph may be set to a material whose color is relatively dim and coarse; and when the issue time of the music is at the stage C, to be specific, after September, 2010, the material of the graph is a material of a dark-yellow nostalgia style, as shown in FIG. 16.

Figure 17:
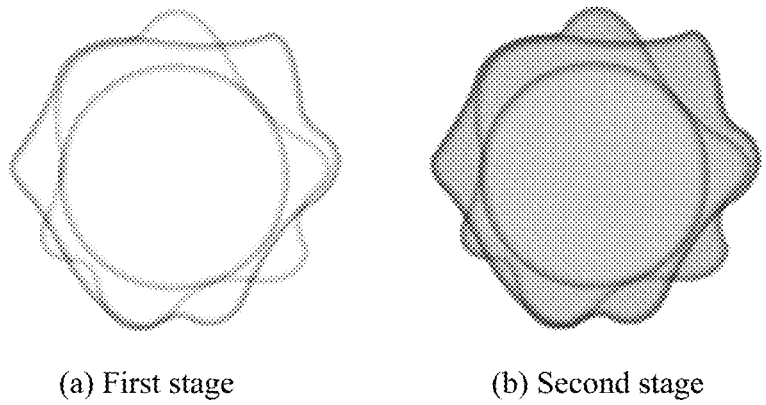
FIG. 17 is another schematic diagram of two graphs determined based on time information of audio data according to an embodiment of the present disclosure.

Based on the time at which the terminal uses the music, the terminal may preset a period of time (for example, the time at which the terminal uses the music is referred to as "time"), the time at which the terminal uses the music last time is used as a reference, half a year is used as a boundary, and two periods of time, that is, time within half a year (a first period of time=time≤6 months) and time after half a year (a second period of time=time>6 months) are set. Using July, 2016 as an example, when the time at which the terminal uses the music last time is in the first period of time, to be specific, after January, 2016, the material of the graph may be set to be bright, as shown in FIG. 17(*a*); and when the time at which the terminal uses the music last time is in the second period of time, to be specific, before January, 2016, the material of the graph may be set to be relatively vague, as shown in FIG. 17(*b*).

Optionally, the terminal may determine a material of the graph based on information about an external environment. The information about the external environment includes information such as weather information, temperature, or humidity of the external environment in which the terminal is located.

For example, when air humidity is larger than preset humidity, the material of the graph may be set to a material with a water drop effect, and when air humidity is smaller than preset humidity, the material of the graph may be set to a material with cracks of dry wood, as shown in FIG. 15(*b*).

Based on the information displaying method provided in the foregoing embodiment, user experience is further improved by using the material of the graph.

The displaying method provided in the foregoing embodiment may be applied to scenarios such as music play, an incoming call, a voice call, recording, voice unlock, and charging.

A recording scenario, an incoming call scenario, a voice unlock scenario, and a charging scenario to which the technical solution is applied are separately described below one by one.

1. Recording Scenario

In this embodiment, recording may include recording performed by using a sound recorder or problem query performed by using a voice assistant, or may be an application scenario such as noise monitoring.

In this embodiment of the present disclosure, a terminal obtains audio data that is recorded audio data; and after obtaining the audio data, the terminal determines a shape of a graph based on attribute information at any moment of a sound represented by the audio data, where the attribute information may include a frequency and an amplitude of the sound, and a type of the audio data, and displays the determined shape of the graph; and when the audio data obtained by the terminal is continuous audio data, the terminal displays a shape of the graph at each moment in a continuous time, so that a user can experience and perceive, in a manner of a dynamic graph, attribute information at the any moment of the sound represented by the audio data, to improve user experience.

In this embodiment of the present disclosure, the shape in the graph is determined based on the attribute information such as the frequency and the amplitude of the sound, and the type of the audio data, and In addition, a maximum distance in distances from points on a bump in the graph to a center of the graph, in other words, a fluctuation amplitude of the bump in the graph when the terminal displays an animation may be further determined based on a distance between a sound source for recording the audio data and a recording entry. For example, using a sound recorder as an example, recording scenarios may be classified into three modes: a solo recording mode, a group recording mode, and a face-to-face recording mode, as shown in FIG. 18.

Figure 18:
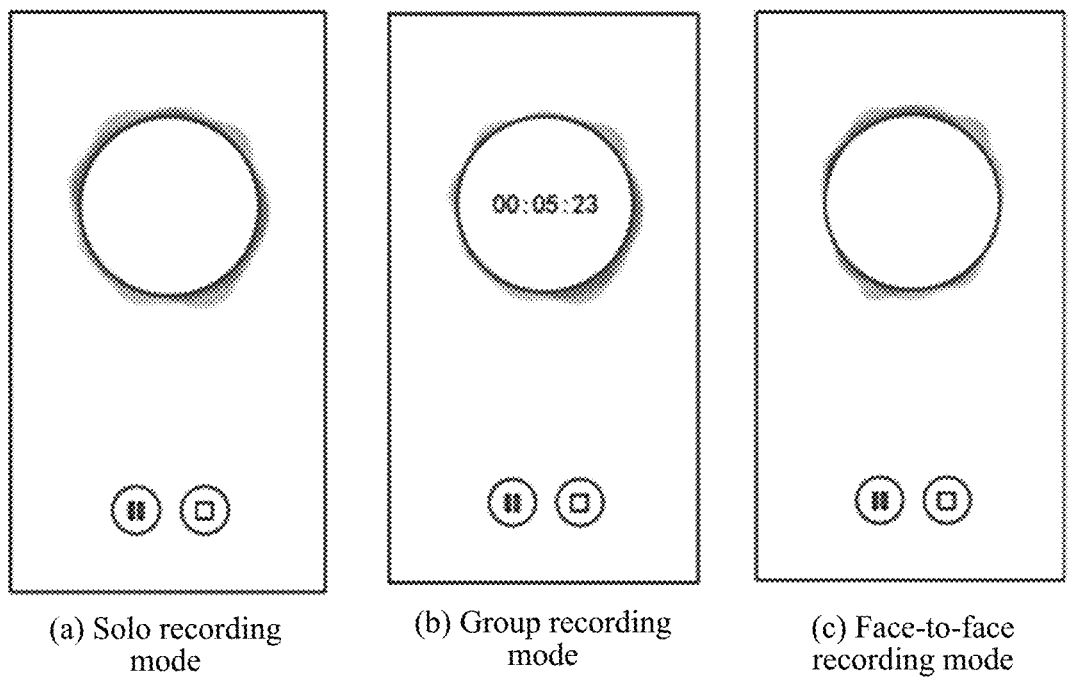
FIG. 18 is a schematic diagram of changes in graphs in three different recording modes according to an embodiment of the present disclosure.

In the solo recording mode, as shown in FIG. 18(*a*), an animation of a graph change is displayed around a circle, and the animation of the graph change is consistent with an animation of a graph change in a music player.

In the group recording mode, as shown in FIG. 18(*b*), at a place at which a sound is high around a circle (for example, at an upper right corner of the circle, a sound source is close to the sound recorder, or a sound amplitude is relatively large at the place), a maximum value of a distance from a bump point on a graph to a center of the graph is relatively large.

In the face-to-face recording mode, as shown in FIG. 18(*c*), an animation of a graph change appears at only an upper end and a lower end of a circle.

Figure 19:
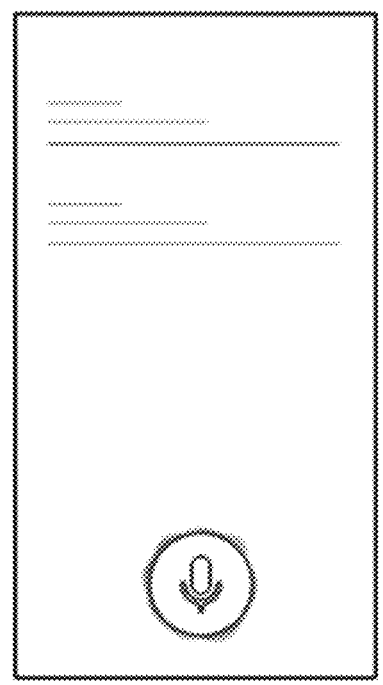
FIG. 19 is a schematic diagram of a change in a graph of a voice assistant recording mode according to an embodiment of the present disclosure.

In this embodiment of the present disclosure, in the scenario of the voice assistant, a graph change rule may be consistent with a graph change rule in the solo recording mode of the sound recorder, as shown in FIG. 19. For brevity, details are not described herein again.

In this embodiment of the present disclosure, an ambient noise may be further detected. The ambient noise is a rule stipulated on a noise tolerance range for protecting population health and a survival environment. When a noise is relatively loud, adverse impact is caused on rest, audition, work, and the like of a person. An ambient noise may be determined by observing a graph change in a graph by using the information displaying method and the terminal provided in the present disclosure.

In this embodiment of the present disclosure, a decibel value of a noise may be predefined and classified. For example, when an ambient noise exceeds a specific decibel value, it indicates that the noise in a current environment is relatively loud, and a shape of a graph does not change relatively greatly, in other words, a maximum distance in distances from points on a bump in the graph to a center of the graph is relatively large, and a rotation speed is relatively high; when an ambient noise is less than a specific decibel value, it indicates that the noise in a current environment is relatively low, and a shape of a graph changes relatively slightly, in other words, a maximum distance in distances from points on a bump in the graph to a center of the graph is relatively small, and a rotation speed is relatively low.

2. "Incoming Call" Scenario

In this embodiment of the present disclosure, the "incoming call" scenario may include a scenario in which when a terminal receives an incoming call from another terminal, the terminal initiates a call or an "outgoing call" to the another terminal and performs a voice call.

When a terminal has an "incoming call", the terminal obtains audio data of an "incoming call" terminal, to be specific, telephone voice data of the "incoming call" terminal, and a maximum distance in distances from points on a bump of a graph displayed on a screen of the terminal to a center of a graph corresponding to any moment may be positively correlated to or may be negatively correlated to a value indicated by attribute information at the any moment. To be specific, a larger value indicated by the attribute information at the any moment indicates a larger or smaller maximum distance in the distances from the points on the bump to the graph corresponding to the any moment.

For example, that the maximum distance is positively correlated to the value indicated by the attribute information includes: the maximum distance is positively correlated to a value obtained by multiplying the value indicated by the attribute information at the any moment by an intimacy coefficient. The intimacy coefficient is used to indicate a level of intimacy between a user of the terminal and a user of the another terminal (or referred to as the "incoming call" terminal), and the intimacy coefficient is obtained based on at least one of a quantity of calls between the terminal and the another terminal, duration of a call between the terminal and the another terminal, information about behavior of refusing to answer an incoming call from the another terminal, information about behavior of adding a number of the another terminal to favorites, information about behavior of creating a contact for the number of the another terminal, and identification information of identifying the number of the another terminal by a number source identification program. It should be noted that, a number source identification program needs to be installed on the terminal, and is an application program configured to identify and mark a number of an incoming call. For example, the number source identification program may identify or mark the number of the incoming call as identification information such as fraud, harassment, peddling, agency, or express.

The terminal determines, based on a value obtained by multiplying the intimacy coefficient of the user of the terminal and the user of the "incoming call" terminal by the value indicated by the attribute information at the any moment, the maximum distance of the distances from the points on the bump of the graph displayed on the screen of the terminal to the center of the graph corresponding to the any moment.

In this embodiment of the present disclosure, the level of intimacy between the user of the "incoming call" terminal and the user of the terminal may be classified into three types such as intimate, ordinary, and strangers.

Figure 20:
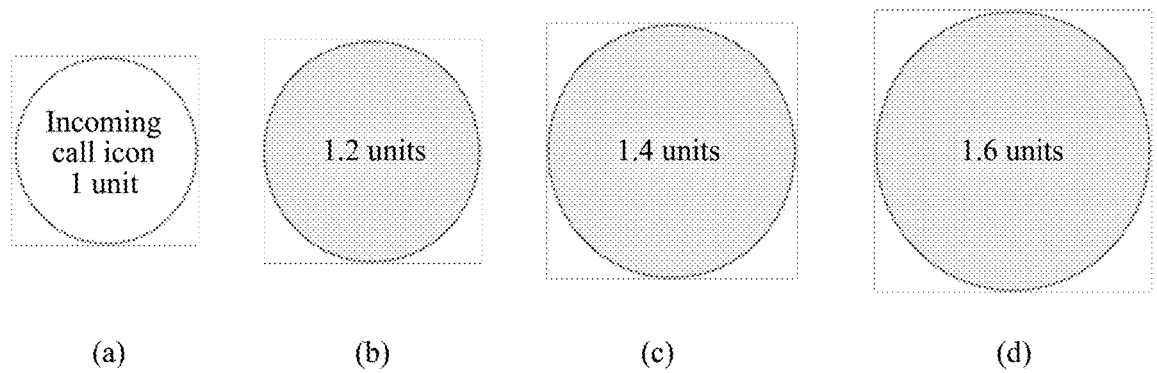
FIG. 20 is a schematic diagram of circles in which maximum values of fluctuation of bumps in three graphs determined based on relationships between two call parties are located according to an embodiment of the present disclosure.

In this embodiment of the present disclosure, a range of a maximum value and a minimum value in distances from points on a bump in a graph to a center of the graph, or a fluctuation amplitude of a bump in a graph may be limited, to separately indicate three relationships that are classified based on a value of a radius of a circumcircle on which a maximum value of the fluctuation amplitude of the bump in the graph is located. The circumcircle is a circle determined by using the circle center of the reference triangle in S310 as a circle center and using a distance from the circle center to a highest point of the bump in the graph as a radius, a radius of a circumcircle indicating that a level of intimacy is intimate may be set to be less than a radius of a circumcircle indicating that a level of intimacy is ordinary, and the radius of the circumcircle indicating that a level of intimacy is ordinary may be set to be less than a radius of a circumcircle indicating that a level of intimacy is strangers. For example, using what is shown in FIG. 20 as an example, a circle of a user icon in the incoming call scenario is used as a reference, and a size unit of the circle is set to one unit. When the level of intimacy is intimate, a circumcircle on which a maximum value of the fluctuation amplitude of the bump of the graph during fluctuation is located is preferably 1.2 units; when the level of intimacy is ordinary, a size of a circumcircle is preferably 1.4 units; or when the level of intimacy is strangers, a size of a circumcircle is preferably 1.6 units.

Figure 21:
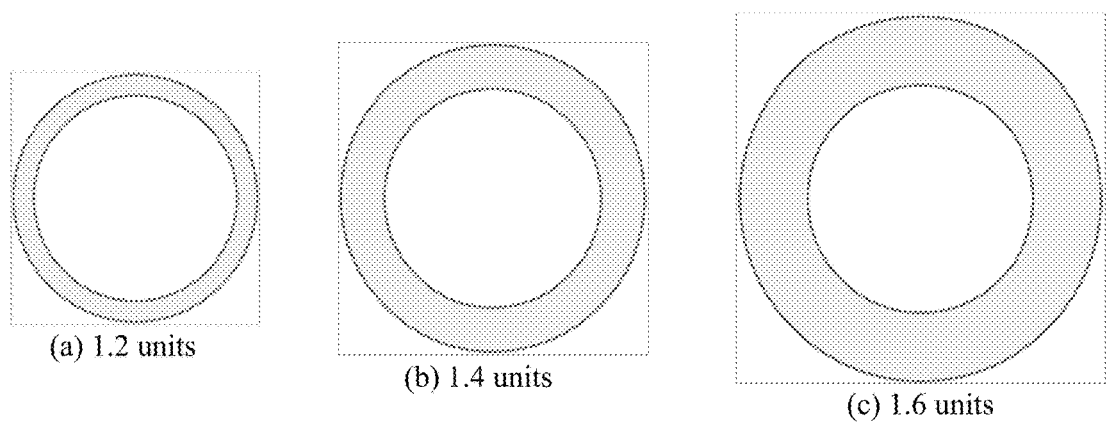
FIG. 21 is a schematic diagram of fluctuation ranges of bumps in three graphs determined based on relationships between two call parties according to an embodiment of the present disclosure.
Figure 22:
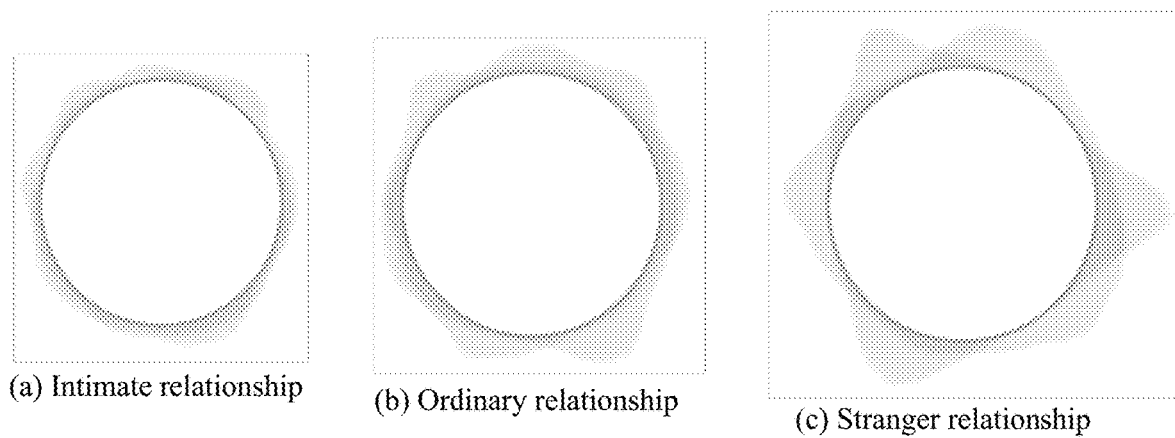
FIG. 22 is a schematic diagram of changes in three graphs determined based on relationships between two call parties according to an embodiment of the present disclosure.
Figure 23:
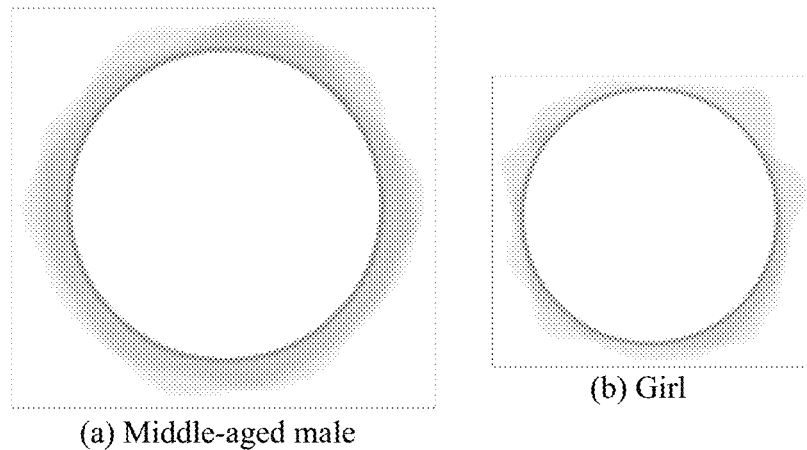
FIG. 23 is another schematic diagram of graphs determined based on sounds according to an embodiment of the present disclosure.

When the level of intimacy between the user of "incoming call" terminal and the user of the terminal is intimate, a minimum value and a maximum value of the fluctuation amplitude of the bump of the graph are between 1 unit and 1.2 units of the circle; when an intimacy relationship between the user of "incoming call" terminal and the user of the terminal is ordinary, a minimum value and a maximum value of the fluctuation amplitude of the bump of the graph are between 1 unit and 1.4 units of the circle; and when the intimacy relationship between the user of "incoming call" terminal and the user of the terminal is strangers, a minimum value and a maximum value of the fluctuation amplitude of the bump of the graph are between 1 unit and 1.6 units of the circle, as shown in FIG. 21. For the three levels of intimacy, graphs finally presented to the user may be shown in FIG. 22. In this embodiment of the present disclosure, a scenario of identifying a personalized characteristic may be further set for the user. The terminal may further analyze a sound attribute of the user, and perform average calculation on information such as a sound frequency, a speaking speed, and an amplitude of the sound attribute of the user, to obtain a calculated average value and obtain a graph, and the graph is used as a unique sound identifier. For example, when the user is a middle-aged male with a sonorous and vigorous sound, the bump of the graph is wide and large, and when the user is a girl with a ringing and delicate sound, the bump of the graph is narrow and small, as shown in FIG. 23.

In this embodiment of the present disclosure, a color, a material, and an area of a graph may be set based on a requirement of the user. For example, an area of a graph corresponding to a girl or a person at a young age may be set to be relatively small; an area of a graph for a person at an old age is relatively large; a color of a graph for a person at an old age may be set to a dull color such as black, gray, or brown; a color of a graph for a person at a young age may be set to a bright color such as fluorescent pink or fluorescent green; or setting is performed based on a gender, a color of a graph for a male may be set to a cool color such as blue, and a color of a graph for a female may be set to a warm color such as pink or red.

3. Voice Unlock Scenario

Voice unlock requires a user to input a sound to a mobile phone, and a graph begins to be generated as the sound of the user is input, and has different deformation as an amplitude, a speed, or the like of the sound differs. A terminal obtains the sound input by the user, and the sound may be a recorded sound of the user that is recorded in advance, a sound input by the user on site, or the like.

The terminal determines a frequency, an amplitude, and a speaking speed of the obtained sound, and determines a shape of the graph based on attribute information of the sound. In this embodiment of the present disclosure, the shape of the graph may be determined based on a preset rule according to which a graph changes based on a sound attribute.

Figure 24:
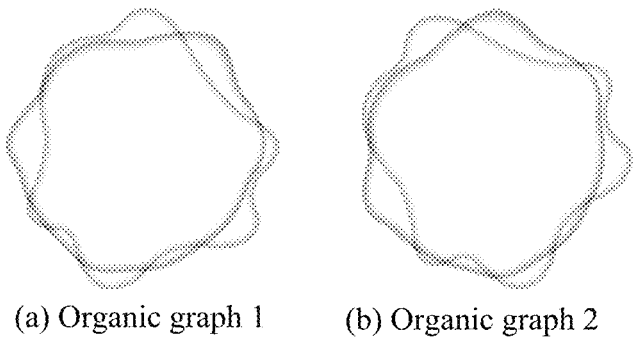
FIG. 24 is a schematic diagram of two graphs applied to voice unlock, and password setting and unlock according to an embodiment of the present disclosure.

The terminal generates, based on the obtained sound of the user, a graph uniquely identifying a person, to form a password graph for the user to enter an application. The password graph may be referred to as a graph 1, as shown in FIG. 24(*a*), and the graph may be presented on a screen of the terminal when the user sets a voice password. When entering the application, the user needs to perform voice unlock, and the terminal forms a graph based on attribute information of the sound input by the user. The graph may be referred to as a graph 2, as shown in FIG. 24(*b*).

4. Charging Scenario

A method for displaying information by a terminal when the terminal is being charged is described in detail below.

Figure 25:
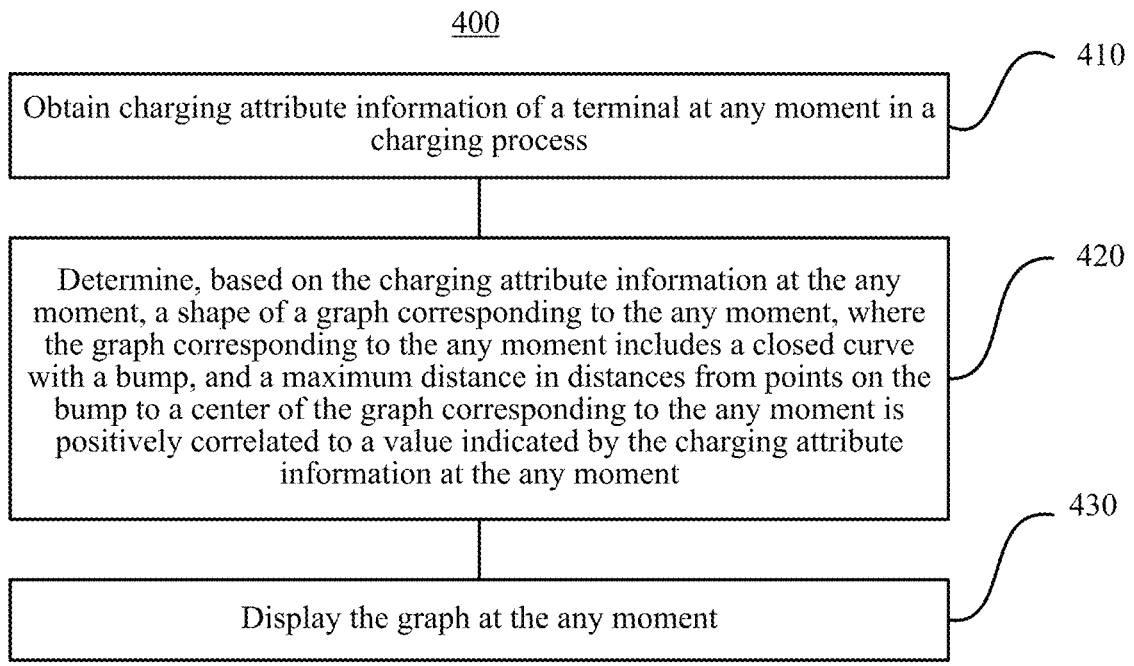
FIG. 25 is a flowchart of another displaying method according to an embodiment of the present disclosure.

FIG. 25 is a flowchart of an information displaying method according to an embodiment of the present disclosure. The method is performed by a terminal. As shown in FIG. 25, the method 400 may include the following steps.

S410. Obtain charging attribute information of the terminal at any moment in a charging process.

The any moment is a moment in the charging process of the terminal. The terminal needs to record and store charging attribute information at all moments in the charging process, so that it is convenient for the terminal to obtain charging attribute information at a specific moment in the charging process.

Preferably, in this embodiment of the present disclosure, the any moment may be a current moment. The terminal obtains charging attribute information at the current moment.

When the terminal is connected to a charging device or is in the charging process, in other words, when the terminal can detect that there is a charging signal (for example, a signal such as a charging voltage or current), the terminal obtains the charging attribute information at the any moment, and the charging attribute information may be a charging voltage value or current value.

S420. Determine, based on the charging attribute information at the any moment, a shape of a graph corresponding to the any moment, where the graph corresponding to the any moment includes a closed curve with a bump, and a maximum distance in distances from points on the bump to a center of the graph corresponding to the any moment is positively correlated to a value indicated by the charging attribute information at the any moment.

The graph may be disposed at a location for displaying charging progress, and preferably may be disposed at a central location of the terminal. A shape of the graph may include a closed curve with a bump and a depression. In this embodiment of the present disclosure, the shape of the graph may be a shape approximating a circle. For example, in a graph surrounded by a curve with a bump and a depression, a connecting line of location points of innermost depressions may form an inscribed circle of the graph, or a shape of the graph may be considered as a circle with a lace.

It should be noted that, in this embodiment of the present disclosure, the shape of the graph may further be another graph including a closed curve with a bump, the graph is of a shape approximating a circle for purpose of only describing the solution of the present disclosure, and the shape of the graph is not limited in this embodiment of the present disclosure.

In the charging process of the terminal, distances from points on the bump of the graph to the center of the graph are different; or in the charging process of the terminal, in an animation in which a graph at the any moment displayed on a screen of the terminal changes, the distances from the points on the bump to the center of the graph have different maximum values. The maximum value of the distance is positively correlated to the charging attribute information at the any moment. For example, the charging attribute information is a charging voltage value. A larger charging voltage value at the any moment indicates a larger value of a maximum distance in distances from points on a bump of the graph corresponding to the any moment to a center of the graph, and a smaller charging voltage value at the any moment indicates a smaller value of the maximum distance in the distances from the points on the bump of the graph corresponding to the any moment to the center of the graph. When the charging attribute information is a charging current value, a larger charging current value at the any moment indicates a larger value of a maximum distance in distances from points on a bump of a graph corresponding to the any moment to a center of the graph, and a smaller charging current value at the any moment indicates a smaller value of the maximum distance in the distances from the points on the bump of the graph corresponding to the any moment to the center of the graph.

It should be noted that, in this embodiment of the present disclosure, the center of the graph is a circle center of the inscribed circle of the graph, or the center of the graph is the preset location point.

In this embodiment of the present disclosure, the graph displayed by the terminal may rotate based on a specified speed. In this embodiment of the present disclosure, the terminal may determine a rotation speed of the graph based on the charging attribute information at the any moment. For example, the terminal determines, based on a charging current value or a charging voltage value at the any moment, a rotation speed of the graph corresponding to the any moment. In this embodiment of the present disclosure, the rotation speed of the graph at the any moment is positively correlated to a charging current value or a charging voltage value corresponding to the any moment. To be specific, a larger charging current value or charging voltage indicates a higher rotation speed of the graph or a larger charging voltage value, and a smaller charging current value or charging voltage value indicates a lower rotation speed of the graph.

In addition, one or more graphs may be set. When there are a plurality of graphs, the graphs are placed in a superposing manner by using circle centers as central points. If there are a plurality of graphs, rotation speeds of the plurality of graphs may be different or the same at any moment. It is assumed that a plurality of graphs are set to rotate based on preset speeds, a quantity of the plurality of graphs is three, and rotation speeds of the three graphs may be: 26 degrees per second, 42 degrees per second, and 38 degrees per second.

In addition, when the terminal displays a plurality of graphs, the plurality of graphs approximate circles (or radiuses of inscribed circles or radiuses of circumcircles of the graphs are different), to improve an identification degree of the user on the graphs, and perceive rotation of the plurality of graphs more clearly and vividly. In other words, when a plurality of graphs are set, to enable the user to clearly perceive rotation of the graphs, radiuses of the plurality of graphs may be set to be different, and graph attributes of the plurality of graphs are set. For example, transparency of a graph at a bottom layer is 50%, and transparency of graphs at other layers is 100%.

S430. Display the Graph Corresponding to the Any Moment.

For example, if a location of the graph is a central location of the terminal, the terminal displays the graph corresponding to the any moment at the central location of the terminal, as shown in FIG. 26. The terminal displays, in a charging chronological order on a display screen, an animation of a change in the graph in the charging process, where the animation includes a change in a shape of the graph and rotation of the graph, to indicate, by using a dynamic effect, that the terminal is being in a charging state, thereby enhancing perception of the user on charging, and improving user experience.

Optionally, in an embodiment of the present disclosure, the charging attribute information at the any moment includes a charging voltage value of the terminal at the any moment in the charging process or a current value of the terminal at the any moment in the charging process.

Optionally, in another embodiment of the present disclosure, a rotating animation in which the shape of the graph corresponding to the any moment rotates is displayed, where in the rotating animation, a rotation speed of the graph corresponding to the any moment is positively correlated to the charging voltage value or the current value.

Optionally, in this embodiment of the present disclosure, the any moment is a current moment.

Optionally, before the determining, based on the charging attribute at the any moment, a shape of a graph corresponding to the any moment, the method may further include:

determining, based on charging attribute information of the terminal at a prior moment before the any moment in the charging process, a shape of a graph corresponding to the prior moment.

Before the displaying the graph corresponding to the any moment, the method further includes: displaying the graph corresponding to the prior moment; and the displaying the graph corresponding to the any moment includes:

displaying an animation in which the graph corresponding to the prior moment changes to the graph corresponding to the any moment.

In this embodiment of the present disclosure, the terminal determines a shape at any moment based on charging attribute information at the any moment, and displays, in the chronological order, a graph at each moment in the charging process, in other words, displays an animation of a change in the graph, so that the user perceives the charging process by using a dynamic picture, to improve user experience.

Optionally, in another embodiment of the present disclosure, as shown in FIG. 27, the method 400 may further include the following step.

S440. Display an animation, where the animation includes an animation in which a particle graph appears at a start location on a screen of the terminal and the particle graph moves to a location of the graph corresponding to the any moment and then disappears at the location of the graph corresponding to the any moment, the particle graph is used to represent a charging current of the terminal, the start location is located on a boundary of the screen, the start location and a charging interface of the terminal are located on a same side of a center of the screen, and the start location is located in a plug-in/out direction of the charging interface.

Figure 28:
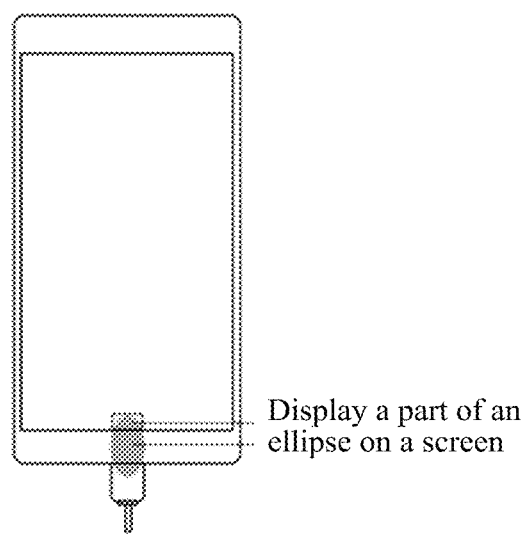
FIG. 28 is a schematic diagram of another graph according to an embodiment of the present disclosure.
Figure 29:
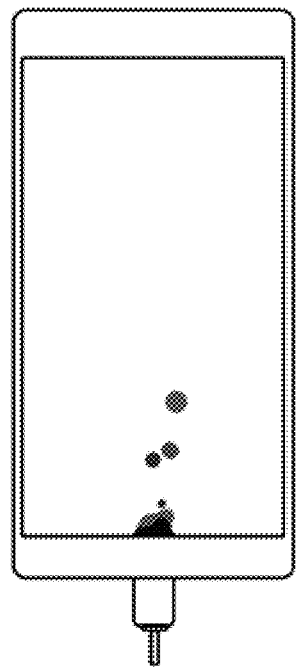
FIG. 29 is a schematic diagram of still another graph and a particle graph according to an embodiment of the present disclosure.

In addition, the method may further include: displaying another graph on the screen of the terminal corresponding to the charging interface, where a shape of the graph displayed on the terminal may be preferably an ellipse. In the charging process, a size of the graph displayed on the display screen of the terminal may be 160*48 px, as shown in FIG. 28. It should be noted that, the size of the graph may be set based on a requirement.

The graph that is displayed on the screen of the terminal and that corresponds to the charging interface may be used as a source point, that is, a start location of the particle graph, and in the charging process, the particle graph emerges from the start location at a specified speed. There may be a plurality of particle graphs, for example, six per second, and a quantity of particle graphs may be specifically set based on a requirement or an aesthetic degree.

A size of the particle graph may be 30 px or float nearby 30 px by using 30 px as a reference, and the size of the particle graph may be specifically set based on a need. This is not limited in this embodiment of the present disclosure.

In this embodiment of the present disclosure, the particle graphs displayed by the terminal are in a moving process, and the terminal further displays up-and-down random floating of some particle graphs. For example, 50% of the particle graphs may randomly float up and down.

By using the information displaying method provided in this embodiment of the present disclosure, the particle graph moves from the start location to the graph corresponding to the any moment, to dynamically and vividly display the charging process of the terminal, and improve user experience.

Figure 30:
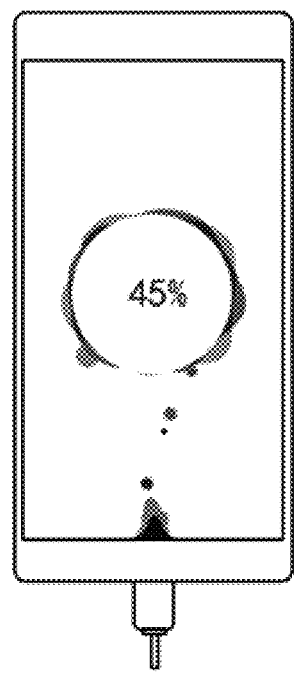
FIG. 30 is a schematic diagram of yet another displayed graph according to an embodiment of the present disclosure.

It should be noted that, in this embodiment of the present disclosure, S430 and S440 are not ordered, and may be displayed simultaneously, as shown in FIG. 30.

Optionally, in another embodiment of the present disclosure, the method 400 may further include:

moving, by the particle graph, to the graph corresponding to the any moment in a charging time; and when the terminal determines that a distance between the particle graph and the graph corresponding to the any moment reaches a preset threshold, blending the particle graph and the graph.

In this embodiment of the present disclosure, after emerging from the start location, the particle graph moves to the graph at a preset speed. When the particle graph moves to a location nearby the graph, for example, when a distance between the particle graph and the graph is less than a preset distance value, the particle graph and the graph are blended.

In the charging process, movement of the particle graph is combined with the rotating graph, to vividly embody that the terminal is in a charging state, increase perception of the user on charging, and improve user experience.

Optionally, in another embodiment of the present disclosure, because the user of the terminal does not always stare at the terminal during charging, it may be set that after the terminal has been connected to the charging device for a preset time (for example, three seconds), the graph displayed on the display screen of the terminal disappears, to reduce power consumption of the terminal. Optionally, in another embodiment of the present disclosure, the method 400 may further include: when the terminal cannot obtain the charging attribute information, skipping displaying the graph, or the graph and the particle graph.

When the terminal is fully charged, emergence of the particle graph from the start location is suspended, and rotation of the graph is stopped. When the terminal is disconnected from the charging device, or when the terminal cannot obtain the charging attribute information, a graph used to embody the charging state disappears, and the moving particle graph disappears.

The information displaying method provided in the embodiments of the present disclosure is described in detail above with reference to FIG. 3 to FIG. 30, and a terminal is described in detail below with reference to FIG. 31 and FIG. 32.

Figure 31:
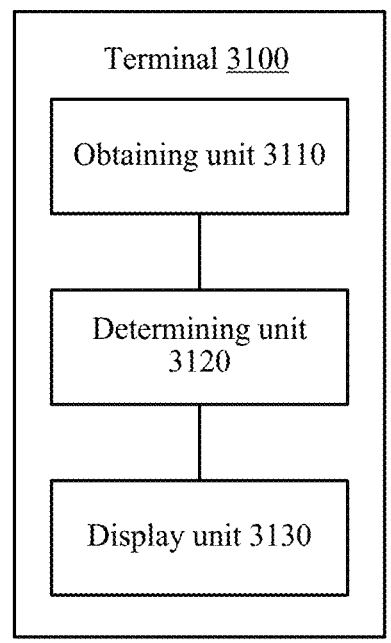
FIG. 31 is a schematic structural diagram of a terminal according to an embodiment of the present disclosure.

FIG. 31 shows a terminal provided in an embodiment of the present disclosure. A terminal 3100 includes: an obtaining unit 3110, a determining unit 3120, and a display unit 3130.

The obtaining unit 3110 is configured to obtain audio data to be played in a chronological order. The determining unit 3120 is configured to determine, based on attribute information at any moment of a sound represented by the audio data, a shape of a graph corresponding to the any moment, where the any moment falls within a range from a start play moment of the sound to an end play moment of the sound, the graph corresponding to the any moment includes a closed curve with a bump, and a maximum distance in distances from points on the bump to a center of the graph corresponding to the any moment is positively correlated to a value indicated by the attribute information at the any moment. The display unit 3130 is configured to display the graph corresponding to the any moment.

The terminal obtains the attribute information at the any moment of the sound represented by the audio data played in the chronological order, determines the shape of the graph that has the bump and that corresponds to the any moment, and presents the graph at the any moment to a user, to enhance perception of the user on the audio data, and improve user experience.

Optionally, in an embodiment of the present disclosure, the attribute information at the any moment includes frequency information within a time period whose duration is a preset value and in which the any moment is located; and the determining unit 3120 is configured to:

determine the frequency information, and determine, based on the frequency information, the shape of the graph corresponding to the any moment.

Optionally, in another embodiment of the present disclosure, a sound may be divided into bass, middle, or treble, and each of the bass, the middle, and the treble includes a band of a frequency. A frequency value included in the band of the treble is greater than a frequency value included in the frequency of the middle that is greater than a frequency value included in the band of the bass.

Alternatively, the frequency information includes high-frequency frequency information, intermediate-frequency frequency information, or low-frequency frequency information. The high-frequency frequency information indicates amplitude information of a high-frequency component of the sound at the any moment, and a frequency of the high-frequency component falls within a preset high-frequency band; the intermediate-frequency frequency information indicates amplitude information of an intermediate-frequency component of the sound at the any moment, and a frequency of the intermediate-frequency component falls within a preset intermediate-frequency band; and the low-frequency frequency information indicates amplitude information of a low-frequency component of the sound at the any moment, and a frequency of the low-frequency component falls within a preset low-frequency band.

The bump includes a high-frequency bump, an intermediate-frequency bump, or a low-frequency bump. A maximum distance in distances from points on the high-frequency bump to the center of the graph corresponding to the any moment is positively correlated to a value indicated by the high-frequency frequency information, a maximum distance in distances from points on the intermediate-frequency bump to the center of the graph corresponding to the any moment is positively correlated to a value indicated by the intermediate-frequency frequency information, and a maximum distance in distances from points on the low-frequency bump to the center of the graph corresponding to the any moment is positively correlated to a value indicated by the low-frequency frequency information.

Optionally, in another embodiment of the present disclosure, the display unit 3130 is configured to:

display a rotating animation in which the graph corresponding to the any moment rotates, where in the rotating animation, a rotation speed of the graph corresponding to the any moment is obtained based on a play speed of the sound at the any moment, and the rotation speed of the graph corresponding to the any moment is positively correlated to the play speed of the sound at the any moment.

The terminal obtains audio data, determines a type of the audio data based on the audio data, and determines, based on the type of the audio data, a play speed of a sound represented by the audio data. For example, using music as an example, when played music is quick rhythm music, a play speed of the sound is high, and when played music is slow rhythm music, a play speed of the sound is low.

The terminal determines a rotation speed of the displayed graph at the any moment based on the play speed of the sound. A higher play speed of the sound indicates a higher rotation speed of the displayed graph at the any moment, and a lower play speed of the sound indicates a lower rotation speed of the displayed graph at the any moment.

Optionally, in another embodiment of the present disclosure, the sound includes music;

the obtaining unit 3110 is configured to obtain a music image, where the music image is used to indicate the music; and the display unit is configured to display the music image within the graph corresponding to the any moment, where the music image falls within the closed curve, and the music image does not intersect the closed curve.

Optionally, in another embodiment of the present disclosure, the terminal further includes: playing the audio data in the chronological order, and the any moment is a current moment.

Optionally, in another embodiment of the present disclosure, the determining unit 3120 is further configured to:

determine, based on attribute information of the sound at a prior moment before the any moment, a shape of a graph corresponding to the prior moment; the display unit 3130 is further configured to display the graph corresponding to the prior moment; and the displaying, by the display unit 3130, the graph corresponding to the any moment includes:

displaying, by the display unit 3130, an animation in which the graph corresponding to the prior moment changes to the graph corresponding to the any moment.

Optionally, in another embodiment of the present disclosure, the obtaining unit 3110 is further configured to obtain a type of the audio data, time information of the audio data, or information about an external environment in which the terminal is located; and the determining unit 3120 is further configured to determine, based on the type of the audio data, the time information of the audio data, or the information about the external environment in which the terminal is located, a material of the graph corresponding to the any moment.

The time information of the audio data is, for example, an issue time of music, or a time at which the terminal plays or uses music last time. The information about the external environment may be information about an environment in which the terminal is located, for example, a weather situation, temperature, or air humidity.

Optionally, in another embodiment of the present disclosure, the terminal may further include:

a maximum distance in distances from points on the bump to the center of the graph corresponding to the any moment is positively correlated to or is negatively correlated to an intimacy level value indicated by relationship information, and the relationship information includes one or more pieces of information in a quantity of calls between the terminal and a calling party, duration of a call, information about behavior of refusing to answer an incoming call from the calling party, information about behavior of adding a number of the calling party to favorites, information about behavior of creating a contact for the number of the calling party, or identification information of identifying the number of the calling party by a number source identification device. The relationship information is obtained by the obtaining unit 3110 of the terminal.

The units of the terminal 3100 provided in this embodiment of the present disclosure may complete any method or step shown in FIG. 3 to FIG. 24. For brevity, details are not described herein again.

Figure 32:
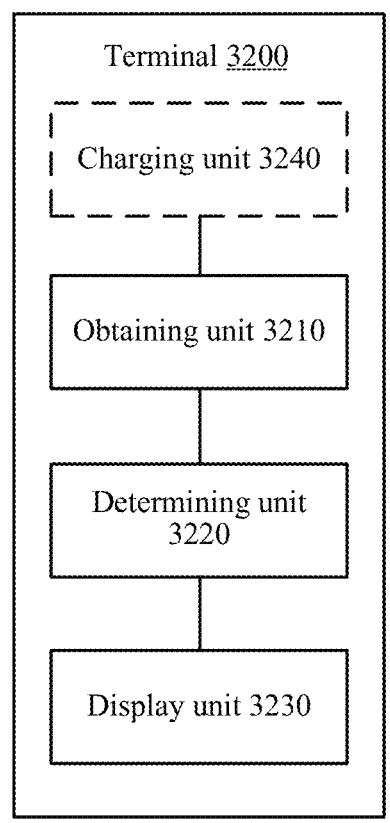
FIG. 32 is a schematic structural diagram of another terminal according to an embodiment of the present disclosure.

FIG. 32 shows another terminal provided in an embodiment of the present disclosure. A terminal 3200 includes: an obtaining unit 3210, a determining unit 3220, and a display unit 3230.

The obtaining unit 3210 is configured to obtain charging attribute information of a terminal at any moment in a charging process.

The determining unit 3220 is configured to determine, based on the charging attribute information at the any moment, a shape of a graph corresponding to the any moment, where the graph corresponding to the any moment includes a closed curve with a bump, and a maximum distance in distances from points on the bump to a center of the graph corresponding to the any moment is positively correlated to a value indicated by the charging attribute information at the any moment.

The display unit 3230 is configured to display the graph corresponding to the any moment.

It should be noted that, the terminal may further include a charging unit 3240. In a process in which the charging unit 3240 charges the terminal, the obtaining unit 3210, the determining unit 3220, and the display unit 3230 of the terminal display information to a user.

The terminal displays the graph on a screen of the terminal that is being charged, and vividly displays the charging process of the terminal based on a shape of a graph of a change in the charging attribute information of the terminal, to improve user experience.

Optionally, in an embodiment of the present disclosure, the charging attribute information at the any moment includes a charging voltage value of the terminal at the any moment in the charging process or a current value of the terminal at the any moment in the charging process.

Optionally, in another embodiment of the present disclosure, the display unit 3230 is configured to display a rotating animation of the graph corresponding to the any moment, where in the rotating animation, a rotation speed of the graph corresponding to the any moment is positively correlated to the charging voltage value or the current value.

Herein, the rotation speed of the graph corresponding to the any moment is positively correlated to the charging voltage value or the current value, to indicate that a larger charging voltage value or current value indicates a larger rotation speed of the graph corresponding to the any moment, and a smaller charging voltage value or current value indicates a smaller rotation speed of the graph corresponding to the any moment.

The terminal displays a rotating and dynamically changing graph to the user, so that the user perceives the terminal charging process by using a dynamic and vivid picture, to improve user experience.

Optionally, in this embodiment of the present disclosure, the any moment is a current moment. To be specific, the terminal determines a shape of the graph at the current moment and a rotation speed of the graph at the current moment based on charging attribute information at the current moment, and presents the shape of the graph at the any moment and a rotating animation of the graph to the user, to improve user experience.

Optionally, in another embodiment of the present disclosure, the determining unit 3220 is further configured to determine, based on charging attribute information of the terminal at a prior moment before the any moment in the charging process, a shape of a graph corresponding to the prior moment. The display unit 3230 is further configured to display the graph corresponding to the any moment.

In this embodiment of the present disclosure, the displaying the graph corresponding to the any moment includes: displaying, by the display unit 3230, an animation in which the graph corresponding to the prior moment changes to the graph corresponding to the any moment.

In the terminal charging process, the terminal obtains charging attribute information at each moment in the charging process, determines, based on the charging attribute information at the any moment, a shape of the graph corresponding to the any moment, and displays an animation of a change in the graph at the any moment to the user.

Optionally, in another embodiment of the present disclosure, the display unit 3230 is further configured to display a charging animation in the charging process, where the charging animation includes an animation in which a particle graph appears at a start location on the screen of the terminal and the particle graph moves to a location of the graph corresponding to the any moment and then disappears at the location of the graph corresponding to the any moment, the particle graph is used to represent a charging current of the terminal, the start location is located on a boundary of the screen, the start location and a charging interface of the terminal are located on a same side of a center of the screen, and the start location is located in a plug-in/out direction of the charging interface.

The terminal displays movement of the moving particle graph to the graph, to vividly embody the charging process of the terminal, and improve user experience.

The units of the terminal 3200 provided in this embodiment of the present disclosure may implement any method or step shown in FIG. 25 to FIG. 30. For brevity, details are not described herein again.

The foregoing descriptions are merely specific implementations of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for displaying information, the method comprising:
    obtaining audio data that represents a sound to be played;
    determining, based on attribute information corresponding to any moment of the sound represented by the audio data, a shape of a graph corresponding to the any moment, wherein the any moment falls within a range from a start play moment of the sound to an end play moment of the sound, wherein the graph corresponding to the any moment includes a closed curve with a bump, and a maximum distance from points on the bump to a center of the graph corresponding to the any moment is correlated to a value indicated by the attribute information at the any moment; and
    displaying the graph corresponding to the any moment;
    wherein the attribute information at the any moment comprises frequency information within a time period whose duration is a preset value and in which the any moment is located;
    wherein the frequency information comprises high-frequency frequency information, intermediate-frequency frequency information, or low-frequency frequency information, wherein:
        the high-frequency frequency information indicates amplitude information of a high-frequency component of the sound at the any moment, and a frequency of the high-frequency component falls within a preset high-frequency band;
        the intermediate-frequency frequency information indicates amplitude information of an intermediate-frequency component of the sound at the any moment, and a frequency of the intermediate-frequency component falls within a preset intermediate-frequency band; and
        the low-frequency frequency information indicates amplitude information of a low-frequency component of the sound at the any moment, and a frequency of the low-frequency component falls within a preset low-frequency band; and
    wherein the bump comprises a high-frequency bump, an intermediate-frequency bump, or a low-frequency bump, wherein a maximum distance from points on the high-frequency bump to the center of the graph corresponding to the any moment is correlated to a value indicated by the high-frequency frequency information, a maximum distance from points on the intermediate-frequency bump to the center of the graph corresponding to the any moment is correlated to a value indicated by the intermediate-frequency frequency information, and a maximum distance from points on the low-frequency bump to the center of the graph corresponding to the any moment is correlated to a value indicated by the low-frequency frequency information.

2. The method according to claim 1, wherein the displaying the graph corresponding to the any moment comprises:
    displaying a rotating animation in which the graph corresponding to the any moment rotates, wherein in the rotating animation, a rotation speed of the graph corresponding to the any moment is obtained based on a play speed of the sound at the any moment, and the rotation speed of the graph corresponding to the any moment is correlated to the play speed of the sound at the any moment.

3. The method according to claim 1, wherein the sound comprises music, and the method further comprises:
    obtaining a music image, wherein the music image is used to indicate the music; and
    displaying the music image within the graph corresponding to the any moment, wherein the music image falls within the closed curve, and the music image does not intersect the closed curve.

4. The method according to claim 3, wherein the method further comprises:
    determining two colors in the music image that occupy a largest area of the music image; and
    displaying the graph corresponding to the any moment using a gradient color from one color of the two colors to the other color of the two colors.

5. The method according to claim 1, wherein the method further comprises:
    playing the audio data in chronological order, wherein the any moment is a current moment.

6. The method according to claim 1,
    wherein before the determining the shape of the graph corresponding to the any moment, the method further comprises:
        determining, based on attribute information of the sound at a prior moment before the any moment, a shape of a graph corresponding to the prior moment;
    wherein before the displaying the graph corresponding to the any moment, the method further comprises:
        displaying the graph corresponding to the prior moment; and
    wherein the displaying the graph corresponding to the any moment comprises:
        displaying an animation in which the graph corresponding to the prior moment changes to the graph corresponding to the any moment.

7. A terminal, comprising:
    a memory configured to store instructions;
    one or more processors configuring to execute the instructions stored in the memory to:
        obtain audio data that represents a sound to be played; and
        determine, based on attribute information corresponding to any moment of the sound represented by the audio data, a shape of a graph corresponding to the any moment, wherein the any moment falls within a range from a start play moment of the sound to an end play moment of the sound, wherein the graph corresponding to the any moment includes a closed curve with a bump, and a maximum distance from points on the bump to a center of the graph corresponding to the any moment is correlated to a value indicated by the attribute information at the any moment; and
a display device configured to display the graph corresponding to the any moment;
wherein the attribute information at the any moment comprises frequency information within a time period whose duration is a preset value and in which the any moment is located;
wherein the frequency information comprises high-frequency frequency information, intermediate-frequency frequency information, or low-frequency frequency information, wherein:
the high-frequency frequency information indicates amplitude information of a high-frequency component of the sound at the any moment, and a frequency of the high-frequency component falls within a preset high-frequency band;
the intermediate-frequency frequency information indicates amplitude information of an intermediate-frequency component of the sound at the any moment, and a frequency of the intermediate-frequency component falls within a preset intermediate-frequency band; and
the low-frequency frequency information indicates amplitude information of a low-frequency component of the sound at the any moment, and a frequency of the low-frequency component falls within a preset low-frequency band; and
wherein the bump comprises a high-frequency bump, an intermediate-frequency bump, or a low-frequency bump, wherein a maximum distance from points on the high-frequency bump to the center of the graph corresponding to the any moment is correlated to a value indicated by the high-frequency frequency information, a maximum distance from points on the intermediate-frequency bump to the center of the graph corresponding to the any moment is correlated to a value indicated by the intermediate-frequency frequency information, and a maximum distance from points on the low-frequency bump to the center of the graph corresponding to the any moment is correlated to a value indicated by the low-frequency frequency information.

8. The terminal according to claim 7, wherein the display device is further configured to:
display a rotating animation in which the graph corresponding to the any moment rotates, wherein in the rotating animation, a rotation speed of the graph corresponding to the any moment is obtained based on a play speed of the sound at the any moment, and the rotation speed of the graph corresponding to the any moment is correlated to the play speed of the sound at the any moment.

9. The terminal according to claim 7, wherein the sound comprises music;
wherein the one or more processors further execute the instructions to obtain a music image, wherein the music image is used to indicate the music; and
wherein the display device is further configured to display the music image within the graph corresponding to the any moment, wherein the music image falls within the closed curve, and the music image does not intersect the closed curve.

10. The terminal according to claim 9,
wherein the one or more processors further execute the instructions to determine two colors in the music image that occupy a largest area of the music image; and
wherein the display device is further configured to display the graph corresponding to the any moment using a gradient color from one color of the two colors to the other color of the two colors.

11. The terminal according to claim 7,
wherein the one or more processors further execute the instructions to determine, based on attribute information of the sound at a prior moment before the any moment, a shape of a graph corresponding to the prior moment; and
wherein the display device is further configured to:
display the graph corresponding to the prior moment; and
display an animation in which the graph corresponding to the prior moment changes to the graph corresponding to the any moment.

12. A non-transitory storage medium storing instructions that, when executed by one or more processors, cause the one or more processors to:
obtain audio data that represents a sound to be played;
determine, based on attribute information corresponding to any moment of the sound represented by the audio data, a shape of a graph corresponding to the any moment, wherein the any moment falls within a range from a start play moment of the sound to an end play moment of the sound, wherein the graph corresponding to the any moment includes a closed curve with a bump, and a maximum distance from points on the bump to a center of the graph corresponding to the any moment is correlated to a value indicated by the attribute information at the any moment; and
causing a display device to display the graph corresponding to the any moment;
wherein the attribute information at the any moment comprises frequency information within a time period whose duration is a preset value and in which the any moment is located;
wherein the frequency information comprises high-frequency frequency information, intermediate-frequency frequency information, or low-frequency frequency information, wherein:
the high-frequency frequency information indicates amplitude information of a high-frequency component of the sound at the any moment, and a frequency of the high-frequency component falls within a preset high-frequency band;
the intermediate-frequency frequency information indicates amplitude information of an intermediate-frequency component of the sound at the any moment, and a frequency of the intermediate-frequency component falls within a preset intermediate-frequency band; and
the low-frequency frequency information indicates amplitude information of a low-frequency component of the sound at the any moment, and a frequency of the low-frequency component falls within a preset low-frequency band; and
wherein the bump comprises a high-frequency bump, an intermediate-frequency bump, or a low-frequency bump, wherein a maximum distance from points on the high-frequency bump to the center of the graph corresponding to the any moment is correlated to a value indicated by the high-frequency frequency information, a maximum distance from points on the intermediate-frequency bump to the center of the graph corresponding to the any moment is correlated to a value indicated by the intermediate-frequency frequency information, and a maximum distance from points on the low-frequency bump to the center of the graph corresponding to the any moment is correlated to a value indicated by the low-frequency frequency information.

13. A method for displaying information, the method comprising:
obtaining, by a terminal, audio data that represents a sound to be played;
determining, by the terminal based on attribute information corresponding to any moment of the sound represented by the audio data, a shape of a graph corresponding to the any moment, wherein the any moment falls within a range from a start play moment of the sound to an end play moment of the sound, wherein the graph corresponding to the any moment includes a closed curve with a bump, and a maximum distance from points on the bump to a center of the graph corresponding to the any moment is correlated to a value indicated by the attribute information at the any moment;
displaying, by the terminal, the graph corresponding to the any moment;
obtaining, by the terminal, a type of the audio data, time information of the audio data, or information about an external environment in which the terminal is located; and
determining, by the terminal based on the type of the audio data, the time information of the audio data, or the information about the external environment in which the terminal is located, a material of the graph corresponding to the any moment;
wherein the information about the external environment in which the terminal is located comprises weather information, temperature, or humidity of the external environment in which the terminal is located.

14. A method for displaying information, the method comprising:
obtaining, by a terminal, audio data that represents a sound to be played;
determining, by the terminal based on attribute information corresponding to any moment of the sound represented by the audio data, a shape of a graph corresponding to the any moment, wherein the any moment falls within a range from a start play moment of the sound to an end play moment of the sound, wherein the graph corresponding to the any moment includes a closed curve with a bump, and a maximum distance from points on the bump to a center of the graph corresponding to the any moment is correlated to a value indicated by the attribute information at the any moment; and
displaying, by the terminal, the graph corresponding to the any moment;
wherein the audio data is data of a telephone voice from another terminal, and that the maximum distance from points on the bump to the center of the graph corresponding to the any moment is correlated to the value indicated by the attribute information at the any moment comprises:
the maximum distance is correlated to a value obtained by multiplying the value indicated by the attribute information at the any moment by an intimacy coefficient, wherein the intimacy coefficient is used to indicate a level of intimacy between a user of the terminal and a user of the another terminal, and the intimacy coefficient is obtained based on at least one of a quantity of calls between the terminal and the another terminal, duration of a call between the terminal and the another terminal, information about behavior of refusing to answer an incoming call from the another terminal, information about behavior of adding a number of the another terminal to favorites, information about behavior of creating a contact for the number of the another terminal, or identification information of identifying the number of the another terminal by a number source identification program.

15. A terminal, comprising:
a memory configured to store instructions;
one or more processors configuring to execute the instructions stored in the memory to:
obtain audio data that represents a sound to be played; and
determine, based on attribute information corresponding to any moment of the sound represented by the audio data, a shape of a graph corresponding to the any moment, wherein the any moment falls within a range from a start play moment of the sound to an end play moment of the sound, wherein the graph corresponding to the any moment includes a closed curve with a bump, and a maximum distance from points on the bump to a center of the graph corresponding to the any moment is correlated to a value indicated by the attribute information at the any moment; and
a display device configured to display the graph corresponding to the any moment;
wherein the one or more processors further execute the instructions to:
obtain a type of the audio data, time information of the audio data, or information about an external environment in which the terminal is located; and
determine, based on the type of the audio data, the time information of the audio data, or the information about the external environment in which the terminal is located, a material of the graph corresponding to the any moment;
wherein the information about the external environment in which the terminal is located comprises weather information, temperature, or humidity of the external environment in which the terminal is located.

16. A terminal, comprising:
a memory configured to store instructions;
one or more processors configuring to execute the instructions stored in the memory to:
obtain audio data that represents a sound to be played; and
determine, based on attribute information corresponding to any moment of the sound represented by the audio data, a shape of a graph corresponding to the any moment, wherein the any moment falls within a range from a start play moment of the sound to an end play moment of the sound, wherein the graph corresponding to the any moment includes a closed curve with a bump, and a maximum distance from points on the bump to a center of the graph corresponding to the any moment is correlated to a value indicated by the attribute information at the any moment; and
a display device configured to display the graph corresponding to the any moment;
wherein the audio data is data of a telephone voice from another terminal, and that the maximum distance from points on the bump to the center of the graph corresponding to the any moment is correlated to the value indicated by the attribute information at the any moment comprises:

the maximum distance is correlated to a value obtained by multiplying the value indicated by the attribute information at the any moment by an intimacy coefficient, wherein the intimacy coefficient is used to indicate a level of intimacy between a user of the terminal and a user of the another terminal, and the intimacy coefficient is obtained based on at least one of a quantity of calls between the terminal and the another terminal, duration of a call between the terminal and the another terminal, information about behavior of refusing to answer an incoming call from the another terminal, information about behavior of adding a number of the another terminal to favorites, information about behavior of creating a contact for the number of the another terminal, or identification information of identifying the number of the another terminal by a number source identification program.

* * * * *